US007912246B1

(12) United States Patent
Moon et al.

(10) Patent No.: US 7,912,246 B1
(45) Date of Patent: Mar. 22, 2011

(54) METHOD AND SYSTEM FOR DETERMINING THE AGE CATEGORY OF PEOPLE BASED ON FACIAL IMAGES

(75) Inventors: Hankyu Moon, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 629 days.

(21) Appl. No.: 12/011,748

(22) Filed: Jan. 29, 2008

Related U.S. Application Data

(63) Continuation-in-part of application No. 10/694,607, filed on Oct. 27, 2003, now abandoned.

(60) Provisional application No. 60/421,717, filed on Oct. 28, 2002.

(51) Int. Cl.
*G06K 9/00* (2006.01)
(52) U.S. Cl. .................. 382/103; 382/118; 382/224
(58) Field of Classification Search .................. 382/100, 382/103, 118, 224, 226
See application file for complete search history.

(56) References Cited

U.S. PATENT DOCUMENTS

| 5,537,488 | A | 7/1996 | Menon et al. |
| 5,781,650 | A | 7/1998 | Lobo et al. |
| 6,526,156 | B1 | 2/2003 | Black et al. |
| 6,973,201 | B1 | 12/2005 | Colmenarez et al. |
| 6,990,217 | B1 | 1/2006 | Moghaddam et al. |
| 7,174,029 | B2 * | 2/2007 | Agostinelli et al. .......... 382/100 |
| 7,236,615 | B2 | 6/2007 | Miller et al. |
| 7,505,621 | B1 * | 3/2009 | Agrawal et al. ............... 382/159 |
| 2002/0102024 | A1 | 8/2002 | Jones et al. |
| 2002/0159627 | A1 | 10/2002 | Schneiderman et al. |
| 2002/0169730 | A1 | 11/2002 | Lazaridis |
| 2003/0161500 | A1 | 8/2003 | Blake et al. |
| 2003/0210808 | A1 | 11/2003 | Chen et al. |
| 2005/0265581 | A1 | 12/2005 | Porter et al. |

OTHER PUBLICATIONS

Srinivas Gutta, et al., "Mixture of experts for classification of gender, ethnic origin, and pose of human faces," IEEE Transactions on Neural Networks, Jul. 2000, vol. 11, No. 4.

* cited by examiner

*Primary Examiner* — Aaron W Carter

(57) ABSTRACT

The present invention is a system and method for performing age classification or age estimation based on the facial images of people, using multi-category decomposition architecture of classifiers. In the multi-category decomposition architecture, which is a hybrid multi-classifier architecture specialized to age classification, the task of learning the concept of age against significant within-class variations, is handled by decomposing the set of facial images into auxiliary demographics classes, and the age classification is performed by an array of classifiers where each classifier, called an auxiliary class machine, is specialized to the given auxiliary class. The facial image data is annotated to assign the gender and ethnicity labels as well as the age labels. Each auxiliary class machine is trained to output both the given auxiliary class membership likelihood and the age group likelihoods. Faces are detected from the input image and individually tracked. Age sensitive feature vectors are extracted from the tracked faces and are fed to all of the auxiliary class machines to compute the desired likelihood outputs. The outputs from all of the auxiliary class machines are combined in a manner to make a final decision on the age of the given face.

24 Claims, 18 Drawing Sheets

| FACIAL IMAGES | AGE | AUXILIARY CATEGORIES | |
|---|---|---|---|
| | | GENDER | ETHNICITY |
|  | AGE CLASS 1 | GENDER CLASS 1 | ETHNICITY CLASS 1 |
|  | AGE CLASS 2 | GENDER CLASS 2 | ETHNICITY CLASS 2 |
|  | AGE CLASS 2 | GENDER CLASS 1 | ETHNICITY CLASS 3 |
|  | AGE CLASS 3 | GENDER CLASS 1 | ETHNICITY CLASS 1 |
|  | AGE CLASS 2 | GENDER CLASS 2 | ETHNICITY CLASS 4 |
|  | AGE CLASS 3 | GENDER CLASS 2 | ETHNICITY CLASS 1 |
| ⋮ | ⋮ | ⋮ | ⋮ |

METHOD AND SYSTEM FOR DETERMINING THE AGE CATEGORY OF PEOPLE BASED ON FACIAL IMAGES

CROSS-REFERENCE TO RELATED APPLICATIONS

This patent application is a continuation in part of U.S. patent application Ser. No. 10/694,607, filed Oct. 27, 2003 now abandoned, which claims the benefit of U.S. Provisional Application No. 60/421,717, filed Oct. 28, 2002

FEDERALLY SPONSORED RESEARCH

Not Applicable

SEQUENCE LISTING OR PROGRAM

Not Applicable

BACKGROUND OF THE INVENTION

1. Field of the Invention

The present invention is a system and method for determining the age of people based on their facial images, using multi-category decomposition architecture of classifiers.

2. Background of the Invention

The method is based on an observation about the facial image ensembles in the image pixel space: that there are a great degree of variability within each set of facial images from the same age group due to gender, ethnicity, and individual differences, so that it is hard to recognize the age group of a person using a traditional multi-class classification approach. Machine learning-based classification methods have been successfully applied to many classification problems, when there are enough training examples available. These methods are based on estimating a mapping from the image space to the space of real numbers or a discrete set of categories using the known relationship between the training images and the ground-truth target values/class labels. The mapping should, therefore, disregard all the irrelevant variations of the image ensembles from the same category, such as lighting, pose, hairstyles, gender, ethnicity, etc. However, it is hard for a single learning machine or several machines (each classifies one category against other categories) to learn and represent the large degrees of variations.

Many complex classification problems can be handled using multi-classifier architectures. A parallel multi-classifier is one of such architectures; multiple specialized learning machines are trained where each machine is tuned to instances from a specific class. The input data is processed by the set of classifiers in a parallel manner, and the final decision is made based on all of the responses from these specialized machines. Many multi-class classification problems are handled this way. Another kind is a serial multi-classifier architecture, where the first classifier performs a gross-level classification and the next classifiers perform finer-level classification. The series of classifications are applied in a serial manner. In the example of age classification, the first classifier can perform children versus non-children classification, the second classifier can perform adult versus senior classification on non-child instances, and so on.

The third kind of multi-classifier architecture is the hybrid multi-classifier architecture. The classification problem is broken down to multiple hybrid classifications where each classifier performs both the gross-level classification and the specialized classification. Each hybrid classifier is tuned to a specific gross-level class, and also performs finer-level classification, which is specialized to the given gross-level class. However, the gross-level classifier does not have to make a hard decision, because it can just output the gross-level class membership likelihood. The same machine or a separate machine can deal with the finer-level classification for the instances from all the gross-level classes, but is specialized to the given gross-level class. The specialization can be implemented by enforcing more accurate finer-level classifier outputs for the instances from the given gross-level class. For example, in the age classification problem, one male hybrid classifier is tuned to male instances and one female hybrid classifier is tuned to female instances. Each classifier also performs age classification (for example, classifies into children, adults, seniors) for all possible data, but the male classifier is specialized to the age classification of male instances and the female classifier is specialized to the age classification of female instances. The final decision is made based on the output from all the hybrid classifiers, by the classifier fusion scheme.

The present invention handles the age classification problem by introducing a multi-category decomposition architecture, which is an exemplary embodiment of the hybrid multi-classifier architecture, where the learning machines are structured and trained to represent the face manifold parameterized by the appearance-based demographics categories. The aforementioned hardship for learning a high-level concept (such as age categories) is handled by decomposing the facial image space into subspaces, where each subspace represents a demographics category. The main idea is to group faces having similar appearances, and perform the task of classification within each group (performed by a specialized hybrid classifier). Pixel appearance based clustering can also be considered; however, the pixel value based clustering does not usually yield meaningful clusters. The clusters may reflect rather arbitrary and accidental features, such as lighting or pose variation. The present invention makes use of auxiliary category information—the demographics categories that are not of given interest—to group the facial images. Age classification can greatly benefit from this scheme, due to the great degree of appearance variability within each gender and ethnicity group. In the case of ethnicity classification, the gender and age are the auxiliary categories. A specialized hybrid learning machine is dedicated to each auxiliary class (=gross-level classes: gender and ethnicity), and age classification is performed within the class. In one of the exemplary embodiments, the multi-category decomposition parameterizes the gender and ethnicity variation using multiple learning machines; each learning machine is learned to respond to a specific (gender, ethnicity) category, and at the same time learned to classify the age group within the (gender, ethnicity) category. The strength of the approach comes from the fact that each machine specializes in the age classification for a limited variation of facial appearance (from the same age and ethnicity). In an exemplary embodiment, the specialization of a learning machine to a given auxiliary category can be implemented using a multi-manifold learning scheme, where the space of facial images is expanded to multiple face manifolds, each corresponding to one of the multiple auxiliary demographics, where each manifold is parameterized by the age vector; the age vector is a representation of age using multiple age-tuned functions. However, the system does not make a hard decision about to which auxiliary class a face belongs. Because there is uncertainty in the class membership, all of the auxiliary class learning machines contribute to the final decision where the contribution is weighted by the likelihood of the given face belonging to the auxiliary class.

Virtually all of the demographics classification system employs some kind of training based on the ground-truth demographics labels. The present invention does not take too much extra effort by annotating auxiliary information in addition to the age value or age group.

The present invention can also handle age classification more effectively by extracting age sensitive features of human faces and conducting classification on these age sensitive features, rather than simply using the raw face images for classifying ages. The age sensitive features can be computed by high-frequency filters that are tuned to location and sizes of facial features, or facial wrinkles.

There have been prior attempts for doing demographics classification based on facial images of people.

U.S. Pat. No. 5,781,650 of Lobo, et al. (hereinafter Lobo) disclosed a method for automatically finding facial images of a human face in a digital image, and classifying the age of the person into an age category. Step 1 of the process is to find facial features of the digital image encompassing the chin, sides of the face, virtual top of the head, eyes, mouth and nose of the image. Step 2 is to compute the facial feature ratios of the facial features ratios of the facial features found in Step 1. Step 3 is to compute a wrinkle analysis of the image. Step 4 is to combine the previous two steps to categorize age of the facial image. The invention can locate and detect facial images for age classification from digital camera images and computer generated images.

U.S. Pat. No. 6,990,217 of Moghaddam, et al. (hereinafter Moghaddam) disclosed a method to employ Support Vector Machines (SVMs) to classify images of faces according to gender, by training the images, including images of male and female faces; determining a plurality of support vectors from the training images for identifying a hyperplane for the gender decision; and reducing the resolution of the training images and the test image by sub-sampling before supplying the images to the Support Vector Machine.

U.S. patent application Ser. No. 11/811,614 filed on Jun. 11, 2007 of Moon, et al. (hereinafter Moon) disclosed a method and system to provide a face-based automatic demographics classification system that is robust to pose changes of the target faces and to accidental scene variables, such as noise, lighting, and occlusion. Given a video stream of people's faces detected from a face detector, the two-dimensional and three-dimensional poses are estimated to facilitate the tracking and the building of pose-dependent facial models. Once the track is complete, the separately built pose-dependent facial models are fed to the demographics classifiers that are again trained using only the faces having the corresponding pose, to determine the final face category, such as gender, age, and ethnicity of the person.

"Mixture of experts for classification of gender ethnic origin and pose of human faces." *IEEE Transaction on Neural Networks*, 11(4):948-960, 2000, S Gutta, J. R. et al. (hereinafter Gutta), disclosed a method to classify gender and ethnicity of human faces using mixtures of experts. The mixture of experts is implemented using the "divide and conquer" modularity principle with respect to the granularity and/or the locality of information. The mixture of experts consists of ensembles of radial basis functions (RBFs). Inductive decision trees (DTs) and support vector machines (SVMs) implement the "gating network" components for deciding which of the experts should be used to determine the classification output and to restrict the support of the input space.

In Lobo, the problem of age classification is handled by focusing on local features that are relevant to aging. The approach is both local feature-based and also per-image classification. While Lobo makes use of local features to solve the age classification problem as the present invention does, the approach is vastly different. The proposed invention performs machine learning training and classification on the extracted age sensitive features so that the machine can automatically learn the relation between these features and the person's age, while Lobo explicitly detects the facial features and wrinkle features and performs rule-based analysis. In the present invention, there is no risk of error in feature detection, because the method collects all potential age sensitive feature responses and the machine learning training learns the relevancy of the features in the context of age classification.

In Moghaddam, they proposed to employ SVM to find the optimal separating hyperplane in feature space to solve the gender recognition problem. This is a typical approach to solve the demographics recognition problem, by estimating the direct relation from the facial image to the demographics labels (such as male, female, etc.). While the age classification problem can be solved in the same manner, a small number of SVMs must learn the concept of age, where there is significant within-class variation. The proposed invention solves the issue by partitioning the facial image space into meaningful groups based on the auxiliary demographics categories such as gender and ethnicity.

In Moon, a comprehensive approach to perform demographics classification from tracked facial images has been introduced. The method to carry out the demographics classification, including the ethnicity classification, also utilizes a conventional machine learning approach to find a mapping from the facial image data to the class labels. Moon put an emphasis on solving the nontrivial problem of pose for the demographics classification, while the present invention focuses on the problem of learning the demographics concept by decomposing the facial image space into auxiliary demographics classes. The present invention also utilizes 2D facial geometry and correction method similar to the method disclosed in Moon.

In Gutta, the methods to classify gender, ethnicity, and pose using the ensembles of neural networks and decision trees have been introduced. While Gutta also uses multiple learning machines (RBF neural networks and decision trees) for the classification problems, they use multiple learning machines blindly without any regard to other demographics information. They cluster the face images using k-means clustering algorithm based on the facial appearance. However, the appearance (pixel values) based clustering does not usually yield meaningful clusters. The clusters may reflect rather arbitrary features, such as lighting or pose variation. The present invention systematically uses other auxiliary demographics information to group the facial images, effectively dividing the age classification into meaningful classes.

There have been prior attempts for finding class information of data by utilizing information from another class or the data attributes in another dimension.

U.S. Pat. No. 5,537,488 of Menon, et al. (hereinafter Menon) disclosed a pattern recognition system. In the training step, multiple training input patterns from multiple classes of subjects are grouped into clusters within categories by computing correlations between the training patterns and the present category definitions. After training, each category is labeled in accordance with the peak class of patterns received within the cluster of the category. If the domination of the peak class over the other classes in the category exceeds a preset threshold, then the peak class defines the category. If the contrast does not exceed the threshold, then the category is defined as unknown. The class statistics for each category are stored in the form of a training class histogram for the category. During testing, frames of test data are received from a subject and are correlated with the category definitions. Each frame is associated with the training class histogram for the closest correlated category.

U.S. Patent Application 20020169730 of Lazaridis, et al. (hereinafter Lazaridis) disclosed computational methods for classifying a plurality of objects or for identifying one or more latent classes among a plurality of objects. The methods glean relationships across at least two distinct sets of objects, allowing one to identify latent classes of objects along one set of margins, observations about which objects provide insight into possible properties or characteristics of objects along another set of margins.

U.S. Patent Application 20030210808 of Chen, et al. (hereinafter Chen) disclosed a method of organizing images of human faces in digital images into clusters, comprising the steps of: locating images of human faces in the digital images using a face detector; extracting the located human face images from the digital images; and forming clusters of the extracted human face images, each cluster representing an individual using a face recognizer.

U.S. Pat. No. 7,236,615 of Miller, et al. (hereinafter Miller) disclosed a method for human face detection that detects faces independently of their particular poses and simultaneously estimates those poses. The method exhibits immunity to variations in skin color, eyeglasses, facial hair, lighting, scale and facial expressions, and others. A convolutional neural network is trained to map face images to points on a face manifold, and non-face images to points far away from that manifold, wherein that manifold is parameterized by facial pose. Conceptually, we view a pose parameter as a latent variable, which may be inferred through an energy-minimization process. To train systems based upon our inventive method, we derive a new type of discriminative loss function that is tailored to such detection tasks. Our method enables a multi-view detector that can detect faces in a variety of poses, for example, looking left or right (yaw axis), up or down (pitch axis), or tilting left or right (roll axis).

The present invention employs an auxiliary class determination method similar to Menon; it simply utilizes the auxiliary class likelihood to weight the age outputs. Lazaridis proposed approaches to identifying one or more latent classes among data by utilizing the class information or data attributes in another dimension. To extract more reliable age information, the present invention makes use of the auxiliary class information. The present invention shares its very broad framework with Lazaridis; it proposes a novel approach to utilizing the fact that the age comparison is more meaningful within the same gender or ethnicity class. Chen introduced a facial image clustering method where the clustering is based on the similarity score from a face recognizer. The present invention utilizes the auxiliary class (membership) likelihood to weight the age scores; however, the class clusters come from auxiliary demographics information rather than the appearance-based scores as in Chen. The present invention shares a fundamental idea with Miller, that of using auxiliary or latent information to improve classification. In Miller, however, the space of facial images are expanded by a convolutional neural network to a single face manifold parameterized by continuous pose parameter, which is assumed to be available, for the purpose of classifying faces from non-faces. In the present invention the space is expanded to multiple face manifolds, each corresponding to one of the multiple auxiliary demographics, where each manifold is parameterized by the age vector.

There have been prior attempts for detecting human faces in still images or in videos.

U.S. Pat. Appl. Pub. No. 20020102024 of Jones, et al. (hereinafter Jones) disclosed an object detection system for detecting instances of an object in a digital image using an image integrator and an object detector, which includes a classifier (classification function) and an image scanner. The image integrator receives an input image and calculates an integral image representation of the input image. The image scanner scans the image in same sized subwindows. The object detector uses a cascade of homogeneous classification functions or classifiers to classify the subwindows as to whether each subwindow is likely to contain an instance of the object. Each classifier evaluates one or more features of the object to determine the presence of such features in a subwindow that would indicate the likelihood of an instance of the object in the subwindow.

U.S. Pat. Appl. Pub. No. 20020159627 of Schneiderman, et al. (hereinafter Schneiderman) disclosed an object finder program for detecting the presence of a three-dimensional object in a two-dimensional image containing a two-dimensional representation of the three-dimensional object. The object finder uses the wavelet transform of the input two-dimensional image for object detection. A pre-selected number of view-based detectors are trained on sample images prior to performing the detection on an unknown image. These detectors then operate on the given input image and compute a quantized wavelet transform for the entire input image. The object detection then proceeds with sampling of the quantized wavelet coefficients at different image window locations on the input image and efficient look-up of pre-computed log-likelihood tables to determine object presence. The object finder's coarse-to-fine object detection strategy coupled with exhaustive object search across different positions and scales results in an efficient and accurate object detection scheme.

The disclosed method assumes that a stream of detected faces are fed to the system, where face detection is performed by utilizing a machine learning-based face detection method, similar to the method disclosed in Jones and Schneiderman.

There have been prior attempts for tracking a human face in video, using appearance-based cue.

U.S. Pat. No. 6,526,156 of Black, et al. (hereinafter Black) disclosed a system that tracks and identifies view-based representations of an object through a sequence of images. As the view of the object changes due to its motion or the motion of its recording device, the object is identified by matching an image region containing the object with a set of basis images represented by an eigenspace. This identification and tracking system operates when views of the object in the image are deformed under some transformation with respect to the eigenspace. Matching between the image region and the eigenspace is performed via a robust regression formulation that uses a coarse-to-fine strategy with incremental refinement. The transformation that warps the image region of a current image frame into alignment with the eigenspace is then used to track the object in a subsequent image frame.

U.S. Pat. Appl. Pub. No. 20030161500 of Blake, et al. (hereinafter Blake) disclosed a new system and method for probabilistic exemplar-based tracking of patterns or objects. Tracking is accomplished by first extracting a set of exemplars from training data. A dimensionality for each exemplar cluster is then estimated and used for generating a probabilistic likelihood function for each exemplar cluster. Any number of conventional tracking algorithms is then used in combination with the exemplars and the probabilistic likelihood functions for tracking patterns or objects in a sequence of images, or in spatial or frequency domains.

U.S. Pat. No. 6,973,201 of Colmenarez, et al. (hereinafter Colmenarez) disclosed an image processing system that processes a sequence of images to generate a statistical model for each of a number of different persons to be tagged so as to be identifiable in subsequent images. The statistical model for a given tagged person incorporates at least one appearance feature, such as color, texture, etc., and at least one geometric feature, such as shape or position of a designated region of similar appearance within one or more images. The models are applied to subsequent images in order to perform a person detection, person location and/or person tracking operation. An action of the image processing system is controlled based on a result of the operation.

U.S. Pat. Appl. Pub. No. 20050265581 of Porter, et al. (hereinafter Porter) disclosed a video data processing apparatus, the video data comprising a sequence of images composed of: an object tracker operable to detect the presence of one or more objects within an image and to track a detected object across successive images; an identity associator operable to associate an identity with an object tracked by the object tracker; a counter operable, for a first and second identity, to count the number of images within which a tracked object associated with the first identity and a tracked object associated with the second identity have both been detected; a similarity detector operable to determine whether two tracked objects are similar in appearance; and the identity associator being operable to change the identity associated with a first tracked object to the identity associated with a second tracked object if: (a) the similarity detector determines that the first and second tracked objects are similar in appearance and (b) the count corresponding to the identities associated with the first and second tracked objects, as counted by the counter, is less than a predetermined threshold.

The disclosed invention utilizes the facial appearance to keep the identity of people, as in Black and Blake. However, the method does not require offline training or model building, because the proposed application builds online models. The inventions of Colmenarez and Porter are designed to track multiple faces and keep the person identity at the same time. The proposed invention, however, does not perform explicit tracking, which requires continuity of the tracks; it just makes correspondences between detected faces. Most of these tracking approaches will fail under low frame rates or severe occlusion, however, the proposed method is still able to track faces under these circumstances.

In summary, the present invention proposes a method to detect, track, and classify age of the facial images. It employs face detection, face tracking, and 2D facial pose estimation in a manner similar to prior inventions, but has a novel way of dividing the age classification into meaningful auxiliary classes where the age classification takes place. While some of the prior inventions use a similar principle of decomposing the classification problem into multiple specialized classifications, each of these classifiers is specialized to appearance-based clusters, which can be an arbitrary group reflecting different lighting or other non-essential features. The present invention also handles the age classification more effectively by using age sensitive features from facial images for both training and classification. The present invention systematically uses other auxiliary demographics information (such as gender and ethnicity) to group the facial images, and each specialized classification is performed within a meaningful demographics class. The classification results from multiple machines are fused using decision trees in the prior invention, while continuous integration, meaningful to probabilistic sense, is used in the present invention.

SUMMARY

The present invention is a system and method for determining the age group of people based on their facial images using a multi-category decomposition architecture learning machine method.

It is one of the objectives of the first step of the processing to annotate the facial image dataset according to the facial appearance of each image in the dataset. Typically gender and ethnicity are annotated in addition to the age of each facial image. In an exemplary embodiment, the gender labels are {male, female} and the age labels can be {child, young adult, adult, senior}. The age can also be annotated with the actual age estimated by the human annotators. The ethnicity labels can be {African, Caucasian, Hispanic, Oriental}. The other demographics categories (gender and ethnicity) other than the category of interest (age) are called auxiliary categories. Other demographics categories based on complexions or body build types can also be considered as auxiliary categories.

It is one of the objectives of the second step of the processing to structure the set of learning machines so that each learning machine represents an auxiliary class. In concept, the array of learning machines represents the multi-dimensional structure of the facial image manifold, parameterized by the auxiliary categories. In an exemplary embodiment, the set of learning machines can be ((male, African), (female, African), (male, Caucasian), (female, Caucasian), (male, Hispanic), (female, Hispanic), (male, Oriental), (female, Oriental)).

It is one of the objectives of the third step of the processing to train the set of learning machines. Each learning machine is trained to output high response to the given auxiliary categories; for example (male, African) machine is trained to output 1.0 for the (male, African) faces while suppressing (output=0.0) the response to faces from other auxiliary categories. Each machine is also trained to output the age group scores of the given input face, where the auxiliary-class specialization of the age classification is enforced by coding the outputs of the given auxiliary class machine differently from all other auxiliary class machines.

In one of the exemplary embodiments of the present invention, both the auxiliary class likelihood and the age group scores (called age vector) are determined by using a multi-manifold learning scheme. In this scheme, the space of facial images is expanded to multiple face manifolds, each corresponding to one of the multiple auxiliary demographics classes. Each manifold is parameterized by the age vector; the age vector is a representation of age using multiple age-tuned functions. The given facial images are trained to output age vector that is close to the manifold to which the facial image belongs; the reciprocal of the distance of the output age vector to the manifold is the auxiliary class likelihood.

It is one of the objectives of the fourth step of the processing to detect faces in an image frame, track the faces, and adjust their two-dimensional poses. The face detection step finds any human faces in a given image frame, localizes and estimates sizes approximately so that a rectangle, whose position and size correspond to the facial image, can be drawn around the boundary of the face. The face tracking keeps identities of people by maintaining a queue of identified faces, and by updating the queues. The facial pose adjustment step estimates the two-dimensional pose variations (position, size, and orientation) of the face. Then the 2D face normalization step applies the image transformation (shift, resizing, and rotation) so that all of the faces have standard position, size, and orientation.

It is one of the objectives of the fifth step of the processing to extract the age sensitive feature vector of the 2D normalized facial images. It involves applying a pre-determined set of filters (that match facial boundary shapes, the locations and shapes of facial features, and facial wrinkles) to compute the feature vector.

It is one of the objectives of the fifth step of the processing to estimate the auxiliary category parameters and then to estimate the age of the face based on the age sensitive feature vector. The age sensitive feature vector is fed to the set of learning machines, and each learning machine outputs both the likelihood of the input face to belong to the given auxiliary categories of the machine, and the age vector. The set of learning machines output these quantities, and the final age vector of the input face is determined by the average of the age outputs from all the machines, weighted by the likelihoods of the auxiliary categories. The averaged age vector determines either the age or the age group of the input face.

DRAWINGS—FIGURES

DETAILED DESCRIPTION OF THE INVENTION

Figure 1:
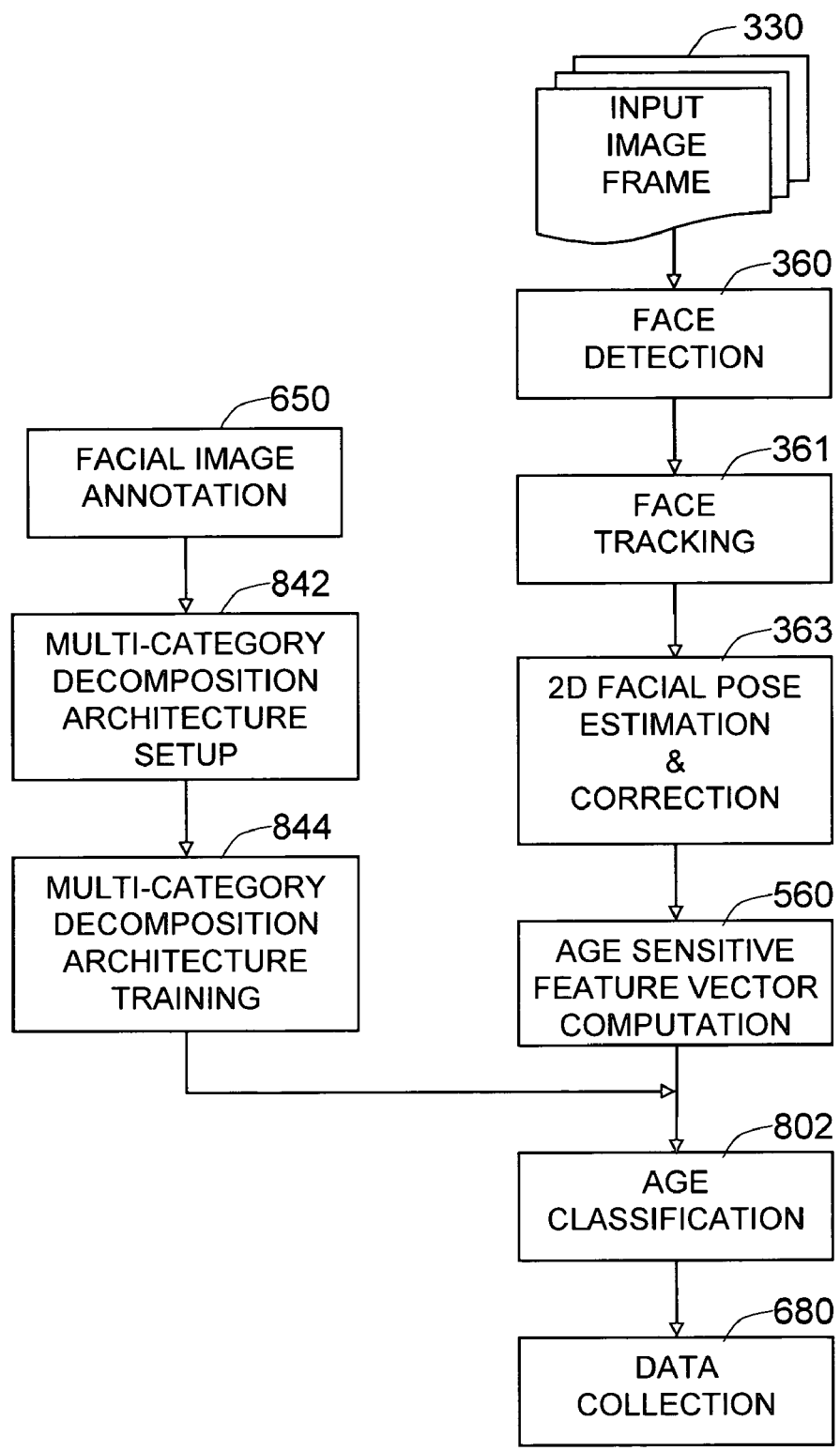
FIG. 1 is an overview of the preferred embodiment of the invention.

A preferred embodiment of the present invention is illustrated in FIG. 1. It shows the overview of the system; the facial image annotation 650 step manually assigns labels (gender, age, ethnicity) to each of the facial images in the face database. The granularity of the labeling should be determined beforehand. In an exemplary embodiment, the faces can be labeled as child, adult, or senior, or can be labeled as 18 and below, from 18 to 30, from 30 to 44, from 45 to 60, and 60 up. They can even be labeled with the actual numeric age, such as 16, 32, 55, etc. The next multi-category decomposition architecture setup 842 step prepares the learning machines corresponding to all of the auxiliary (gender, ethnicity) classes. The multi-category decomposition architecture training 844 step trains all of the learning machines so that they generate the desired sets of outputs for the set of input facial images. In a preferred embodiment, the training is performed on the age sensitive feature vectors computed from the facial images, rather than on the raw facial images themselves. Once the training is done, the system is ready to process any facial image to determine its age. Given an input image frame 330, the face detection 360 step finds faces in the input image frame along with their approximate location and size. The face tracking 361 step then keeps the identities of individual faces by maintaining a queue of tracks. The 2D facial pose estimation and correction 363 step normalizes the facial geometry to a standard position, size, and orientation. The age sensitive feature vector computation 560 step extracts the age sensitive feature vector 562 from the 2D corrected facial image. Then the age classification 802 step uses a trained array of age classification machines to determine the age of the face, using the age sensitive feature vector. The data collection 680 step stores, displays or transmits the determined age group labels.

Figure 2:
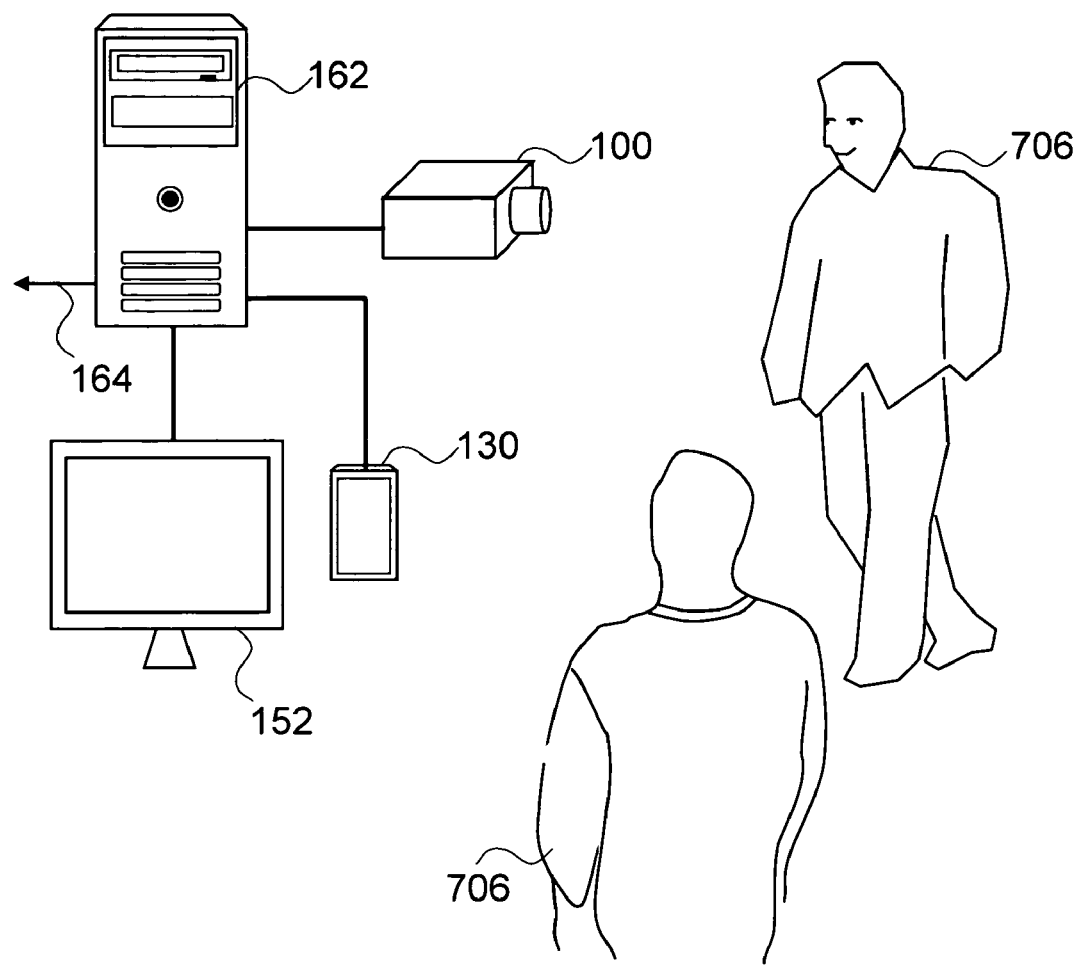
FIG. 2 is a view of the preferred embodiment of the invention in an operational environment.

FIG. 2 shows a view of the system of the invention in an operational environment in an exemplary embodiment. The means for capturing images 100 is connected to a control and processing system 162 via analog, USB, Firewire, Ethernet, or wireless connection. The position, orientation, and the field of view of the means for capturing images 100 are determined to maximize the coverage of the target person 706. The means for capturing images 100 captures the facial images of a target person 706 and sends them to the control and processing system 162, which holds most of the processing and generates the data. The output data is stored to an internal or external storage 130, displayed using a visual display 152, or transmitted to a network using a network connection 164.

Figure 3:
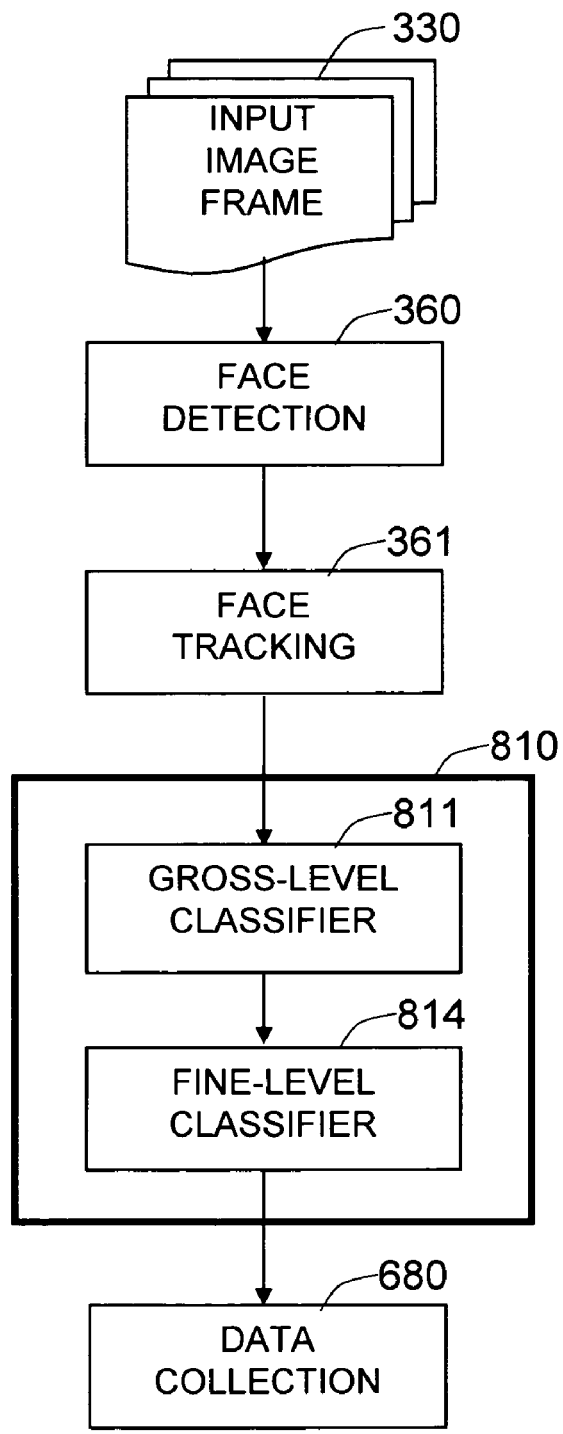
FIG. 3 is a view of a serial multi-classifier architecture.

FIG. 3 shows an overview of an exemplary embodiment of the serial multi-classifier 810 architecture designed for the age classification problem. From the input image frame 330, faces are detected by the face detection 360 step and tracked by the face tracking 361 step. The first gross-level classifier 811 performs a classification on the tracked facial images into broad classes, and the next finer-level classifier 814 performs classification into subclasses of the broad classes. The series of classifications are applied in a serial manner. One example is where the first classifier can perform child versus non-child classification, the second classifier can perform adult versus senior classification on non-child instances, and so on.

Figure 4:
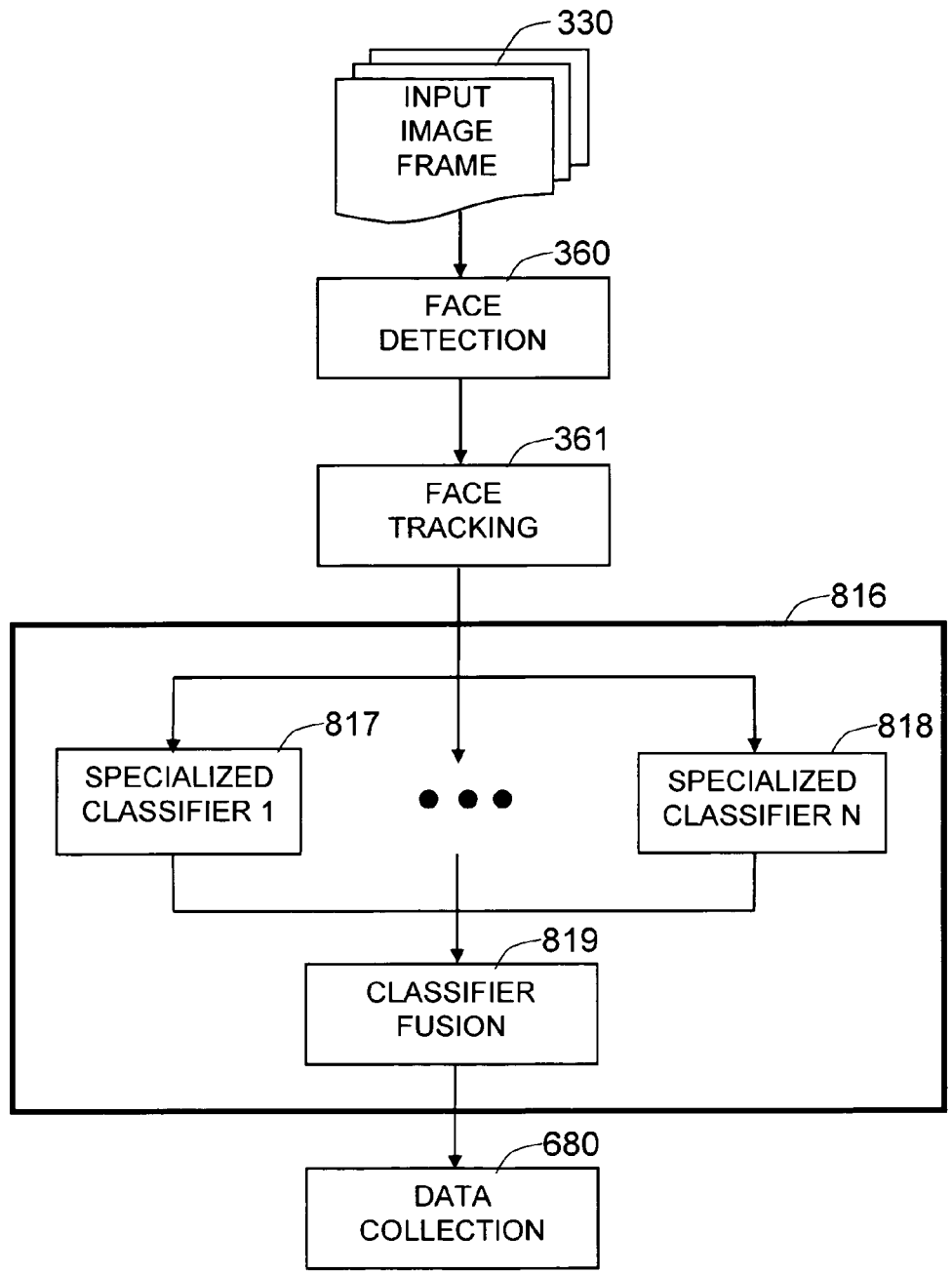
FIG. 4 is a view of a parallel multi-classifier architecture.

FIG. 4 shows an overview of an exemplary embodiment of the parallel multi-classifier 816 architecture. From the input image frame 330, faces are detected by the face detection 360 step and tracked by the face tracking 361 step. In the parallel multi-classifier architecture 816, multiple specialized classifiers, from a specialized classifier 1 817 to a specialized classifier N 818, are trained, where each classifier is tuned to faces from a specific class. The tracked facial image is processed by the set of trained classifiers in a parallel manner, and the final decision is made based on all of the responses from these specialized machines at the classifier fusion 819 step. Many multi-class classification problems are handled this way.

Figure 5:
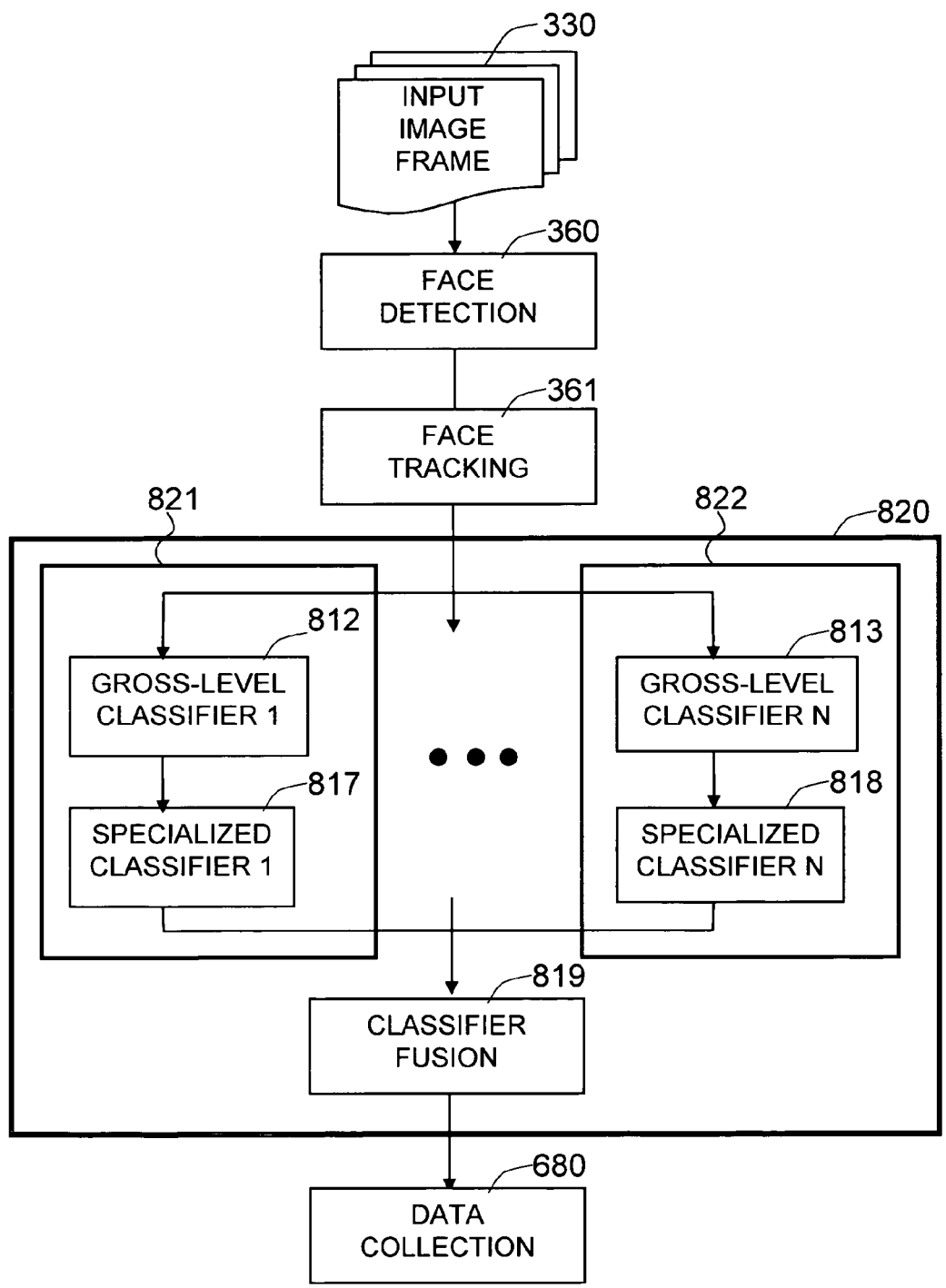
FIG. 5 is a view of a hybrid multi-classifier architecture.

FIG. 5 shows an overview of an exemplary embodiment of the hybrid multi-classifier 820 architecture. From the input image frame 330, faces are detected by the face detection 360 step and tracked by the face tracking 361 step. The age classification problem on the tracked facial image is broken down to multiple hybrid classifiers, where each classifier, from a hybrid classifier 1 821 to a hybrid classifier N 822, performs both the gross-level classification and the specialized classification; the hybrid classifier 1 821 consists of the gross-level classifier 1 812 and the specialized classifier 1 817, and the hybrid classifier N 822 consists of the gross-level classifier N 813 and the specialized classifier N 818. Each hybrid classifier is tuned to a specific gross-level class and also performs finer-level classification, which is specialized to the given gross-level class. For example, in the hybrid classifier 1 821, the gross-level tuning is performed by the gross-level-classifier 1 812, and the finer-level classification is performed by the specialized classifier 1 817. However, the gross-level classifier does not have to make a hard decision, because it can just output the gross-level class membership likelihood. The specialized classifiers deal with the finer-level classification for the instances from all of the gross-level classes, but are specialized to the given gross-level class. The final decision is made by the classifier fusion 819 step, based on the output from all of the hybrid classifiers.

Figure 6:
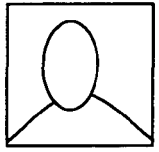
FIG. 6 shows the ground truth demographics labeling scheme for the facial image annotation.
Figure 6:
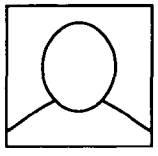
Figure 6:
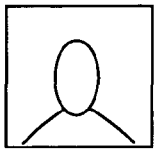
Figure 6:
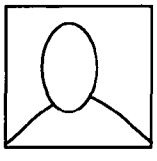
Figure 6:
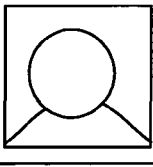
Figure 6:
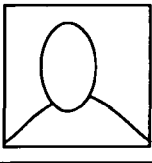

FIG. 6 shows the ground truth demographics labeling 654 scheme for the facial image annotation 650 in an exemplary embodiment of the present invention. First, the auxiliary demographics categories 665 should be determined. In the figure, gender and ethnicity are determined as auxiliary categories. In an exemplary embodiment, the gender category has {male, female} labels. The ethnicity classes can be determined according to the given application; typical divisions are {African, Caucasian, Oriental} or {African, Caucasian, Hispanic, Oriental}. The age category has {child, young adult, adult, senior} labels. The age category can also be more finely divided into a larger number of classes, such as {-9, 10-19, 20-29, 30-39, 40-49, 50-59, 60-69, 70-}. In another exemplary embodiment, the actual ages, such as {16, 32, 47, 62}, can be annotated, and can be regarded as age classes in the finest granularity. Human annotators typically view the facial images displayed on computer monitors and determine the demographics labels.

Figure 7:
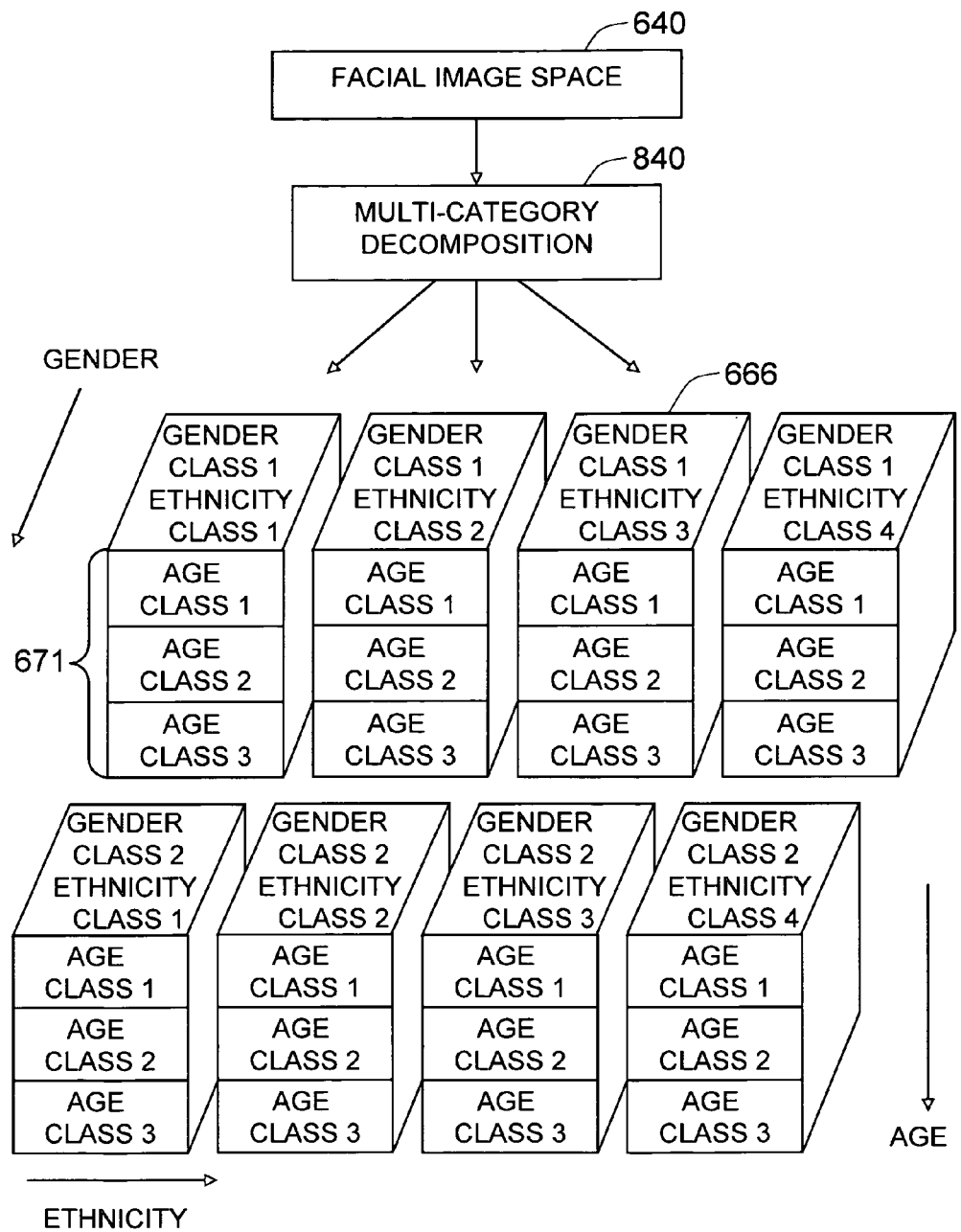
FIG. 7 shows the scheme of multi-category decomposition.

FIG. 7 shows the multi-category decomposition architecture 841 in an exemplary embodiment of the present invention. The multi-category decomposition architecture 841 is also an exemplary embodiment of the hybrid multi-classifier 820 architecture that was illustrated in FIG. 5. The whole facial image space 640 is partitioned into each of an auxiliary class 666. In this exemplary embodiment, the auxiliary categories are two-dimensional: gender and ethnicity. Each auxiliary class has facial images having varied age classes 671: child, adult, and senior. Each auxiliary class is represented by a hybrid classifier that is tuned to the auxiliary class 666, and trained to classify the age group of the facial images belonging to the auxiliary class 666. Within the hybrid classifier, the gross-level classifier and the specialized classifier can be implemented by separate learning machines or a single learning machine.

Figure 8:
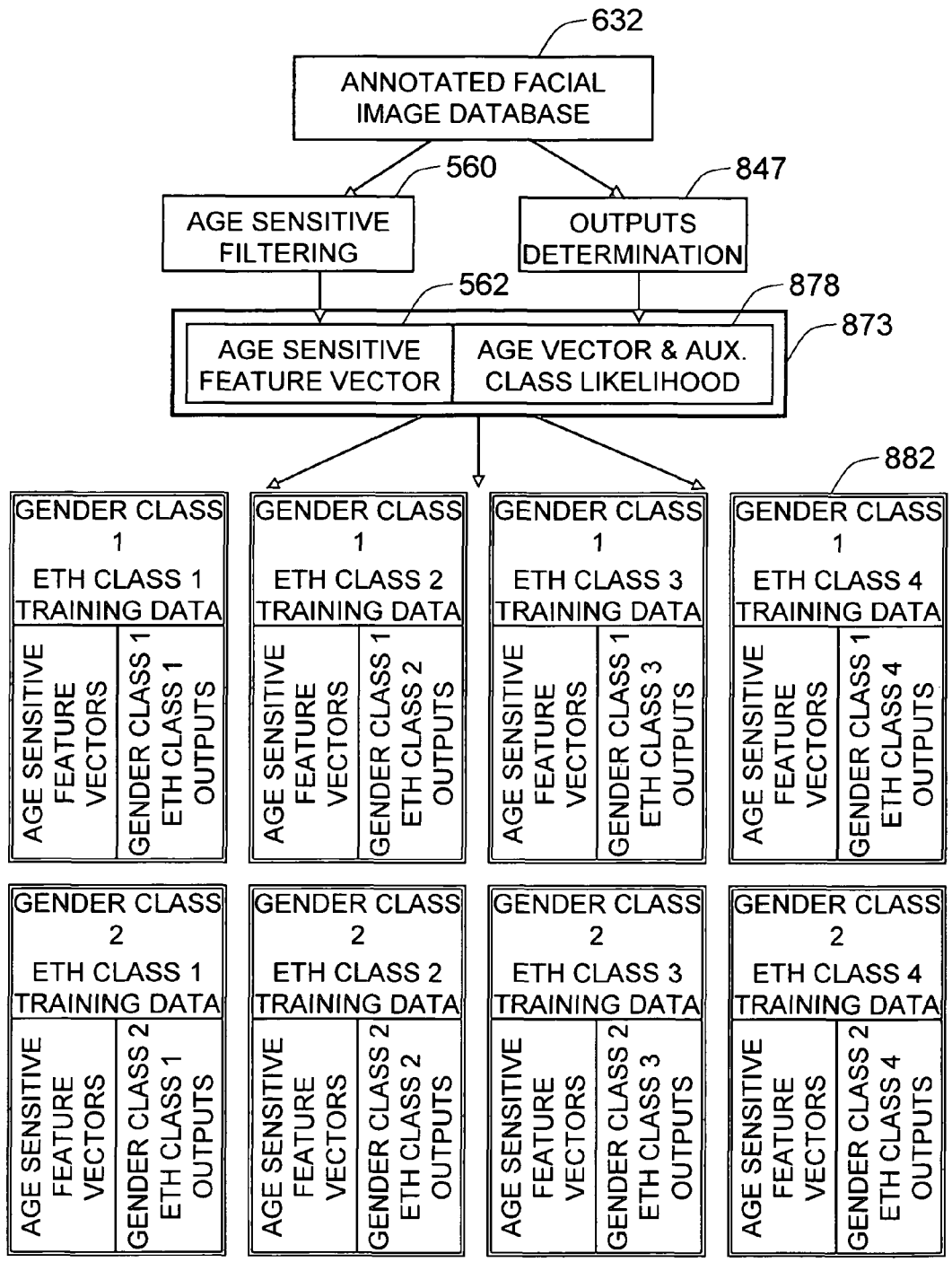
FIG. 8 shows the training data preparation scheme.

FIG. 8 shows the training data preparation scheme in an exemplary embodiment of the present invention. The annotated facial image database 632 is converted to a set of auxiliary class training data 882, through the age sensitive filtering 560 step and the outputs determination 847 step. The age sensitive filtering 560 step extracts the age sensitive feature vector 562, and the outputs determination 847 step determines the desired age vector and auxiliary class likelihood output 878 for each training data 880; each training data consists of age sensitive feature vectors 564 and age vector and auxiliary class likelihood output 878. Each training data corresponds to one of the auxiliary classes. The age sensitive feature vectors 564 are common for all of the training data but the desired outputs depend on the given auxiliary class; each learning machine receives the same images (or the same age sensitive feature vectors), but is trained to output different quantities.

Figure 9:
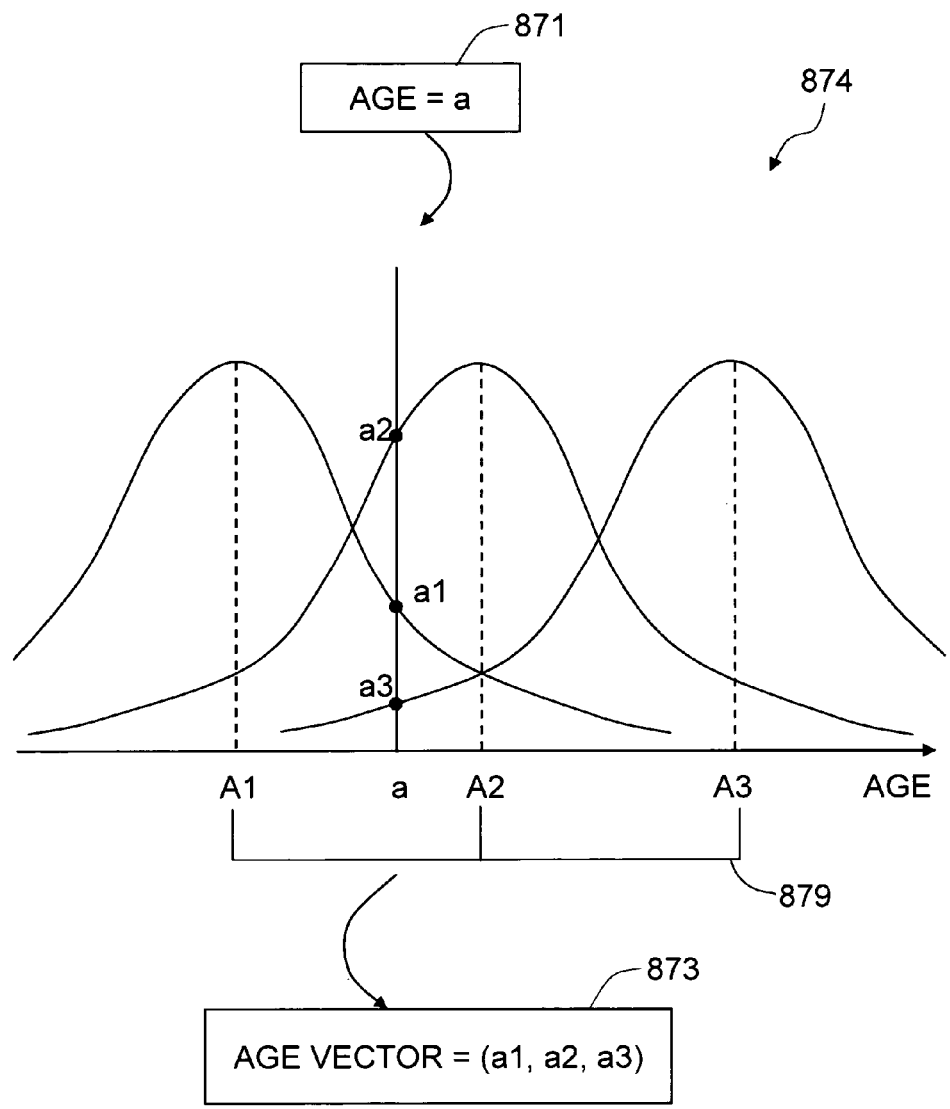
FIG. 9 shows the age vector computation scheme.

FIG. 9 shows the age vector coding 874 scheme. Age vector is a parameterization of age or age group in an auxiliary class manifold 675. A given "age a" 871 is evaluated by a number of bell-shaped symmetric functions 906, each centered at predetermined fixed age values A1, A2, and A3 879 (typically equally spaced). The evaluated values, a1, a2, and a3, are recorded as an age vector (a1, a2, a3) 873. In a typical embodiment, the fixed age values A1, A2, and A3 879 are representative ages of the given set of age groups. When the given "age a" 871 is an age group label instead of a specific age value, the age vector is binary. That is, when the "age a" 871 belongs to the age group A1, the corresponding age vector is (1, 0, 0).

Figure 10:
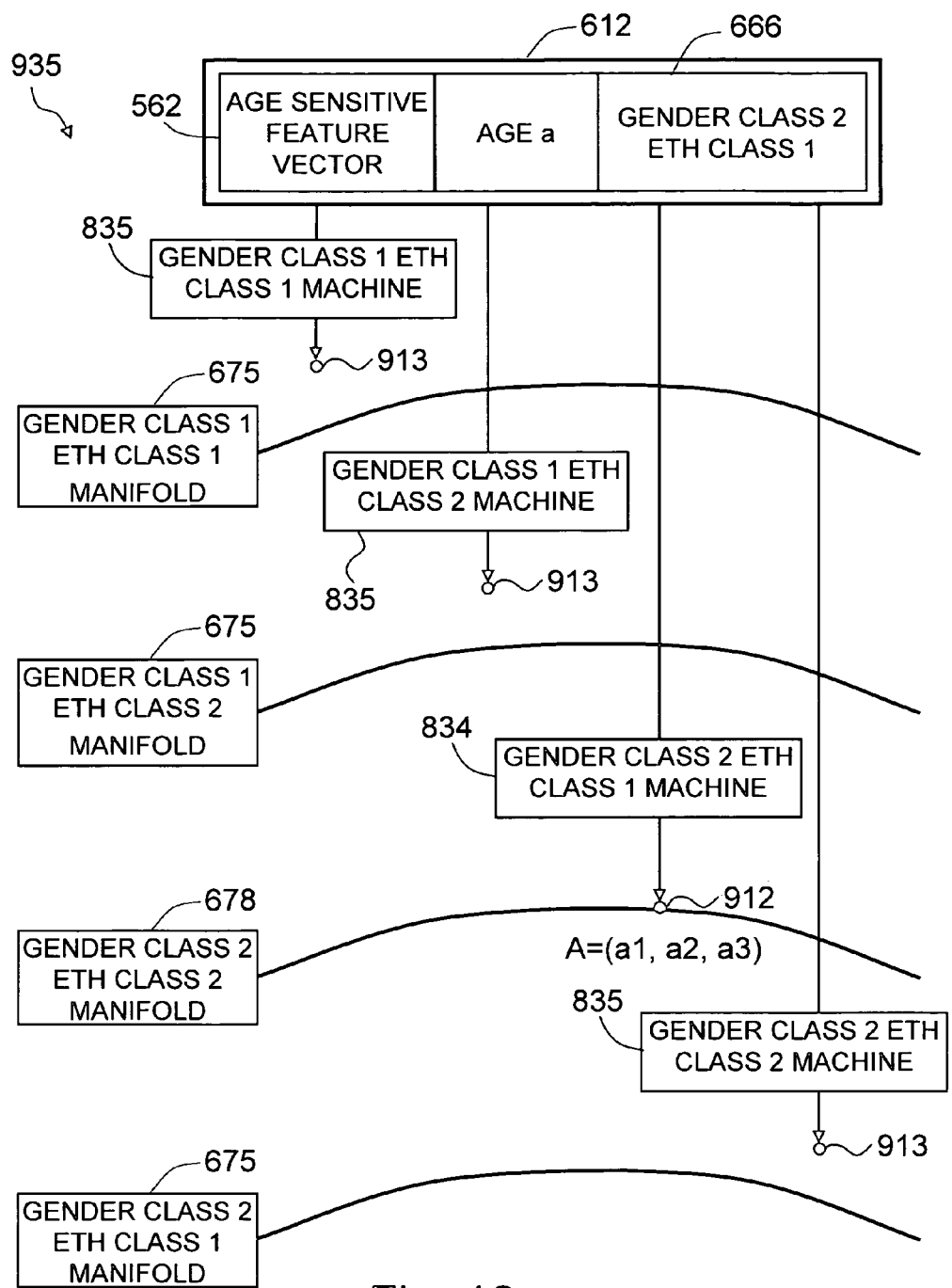
FIG. 10 shows the age vector coding scheme.

FIG. 10 shows the age manifold mapping 935 scheme as an exemplary embodiment of the multi-category decomposition scheme. In this exemplary embodiment, the face space is divided into multiple auxiliary class manifolds 676, where each auxiliary class manifold 675 is learned using the corresponding auxiliary class machine 835, by sending an input data 612 belonging to the auxiliary class to a point on the manifold 912, and sending an input data 612 belonging to other class to a point away from the manifold 913. The mapping from the input data (of the facial images or features) to the auxiliary manifold (when the facial image belongs to the corresponding auxiliary class) is determined by the age vector coding 874 scheme. For example, the given input data 612 belonging to the auxiliary class (gender class 2, ethnicity class 1) is mapped to a point (a1, a2, a3) 912 on the (gender class 2, ethnicity class 1) manifold 678, by the (gender class 2, ethnicity class 1) machine 834. The input data is mapped to a point 913 away from the auxiliary class manifold 675 by a different auxiliary class machine 835, when the face does not belong to the auxiliary class.

Figure 11:
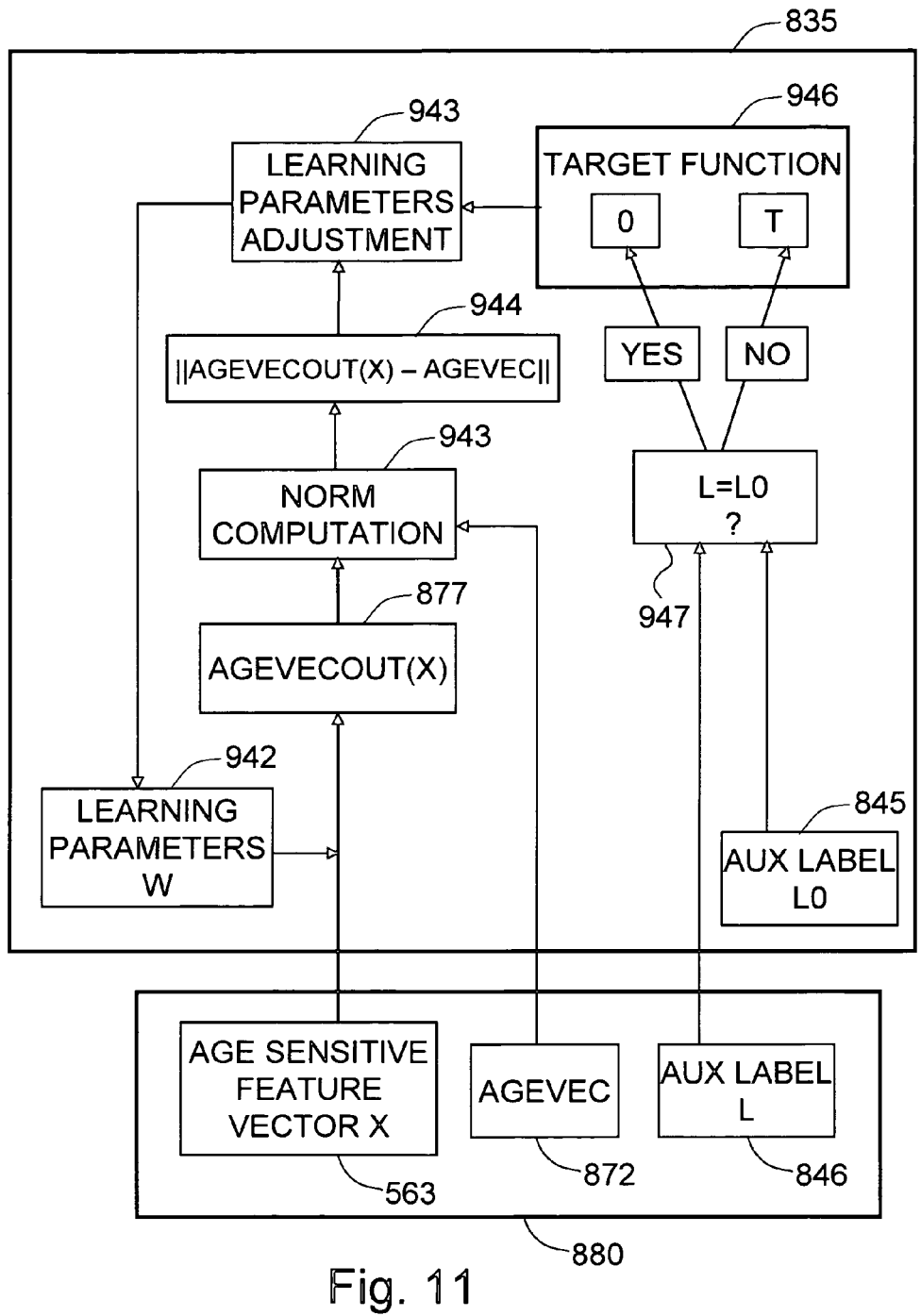
FIG. 11 shows the age vector manifold mapping scheme as an exemplary embodiment of the multi-category decomposition scheme.

FIG. 11 shows an exemplary embodiment of the auxiliary class machine 835 training for the age manifold mapping 935 scheme. The auxiliary class machine 835 consists of the learning parameters 942, the norm computation 943, the target function switch 947, the target function 946, and the learning parameter adjustment 943. For each training cycle, the training data 880 is fed to the auxiliary class machine 835 having the auxiliary class label L0 845. The set of learning parameters 942 is applied to the age sensitive feature vector X 563 of the training data 880, and the agevecout(X) 877 (the estimated age vector) is computed. The norm computation 943 produces the norm 944 of the difference between the agevecout(X) 877 and the ground truth age vector 872. The target function switch 947 compares the given auxiliary class label L0 845 and the auxiliary class label L 846 of the training data, to see whether they are the same. If the answer is YES, the target function 946 is 0; if the answer is NO, the target function 946 is a fixed value T. Then the learning parameter adjustment 943 compares the computed norm 944 and the target function 946 to adjust the learning parameters 942 so that the computed norm 944 approaches the target function 946.

Figure 12:
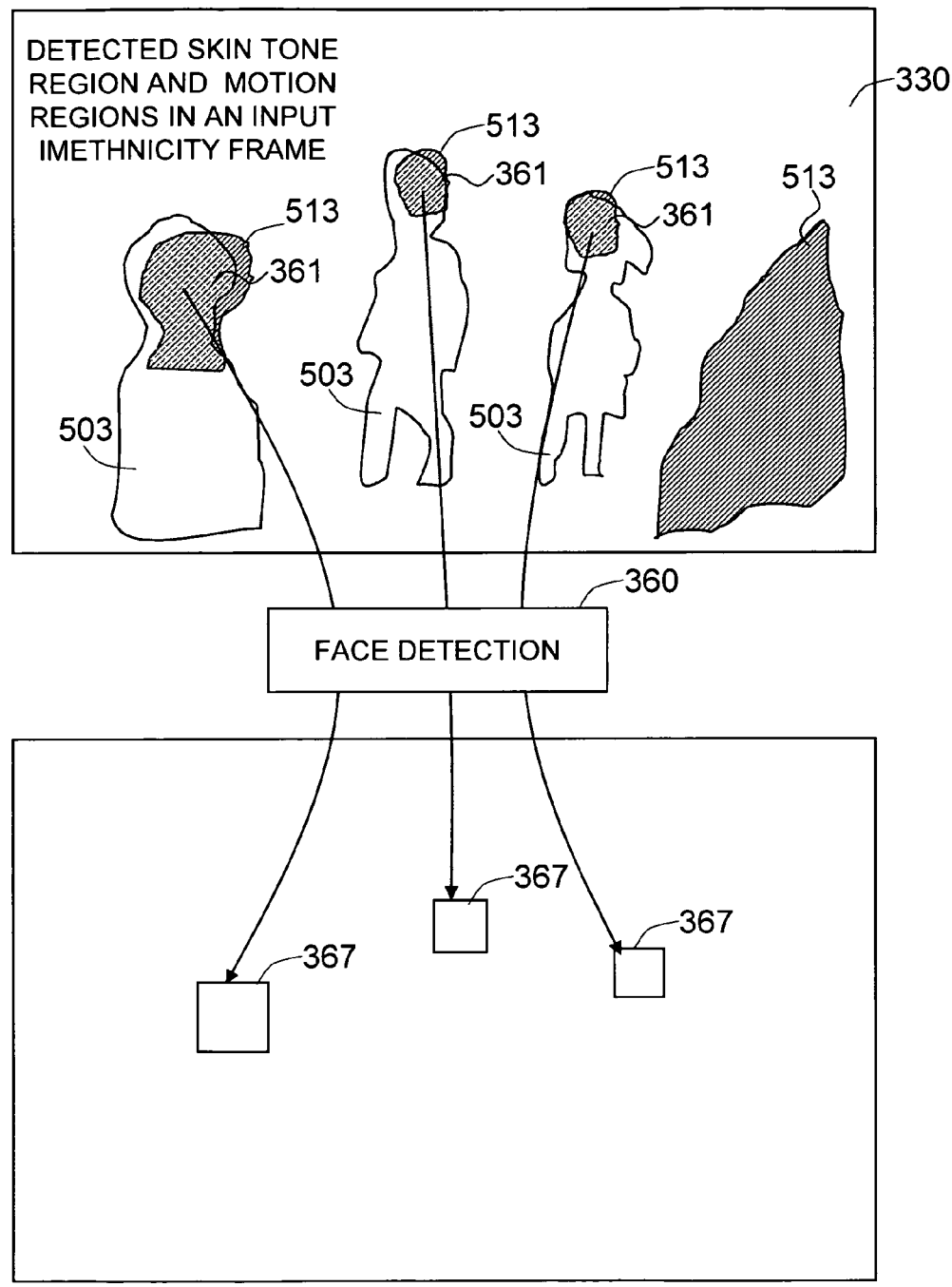
FIG. 12 is a view of the preferred embodiment of the face detection step.

FIG. 12 shows the face detection scheme in an exemplary embodiment of the present invention. Skin tone detection and motion detection are performed in input image frame 330, to limit the search space for the face detection 360, and at the same time to reduce the falsely detected faces. The skin tone detection utilizes color information to find regions in the input image frame where the human faces are likely to be present. The motion detection finds the region in the image frame where any movement takes place. In the exemplary embodiment, the region overlapped by the skin tone region 513 and the motion region 503 is chosen as the face detection region 361. Any image based face detection 360 algorithm can be used to detect human faces in the face detection region 361. Typically, a machine learning based face detection algorithm is employed. The face detection algorithm produces face windows 367 that correspond to the location and the size of the detected faces 365.

Figure 13:
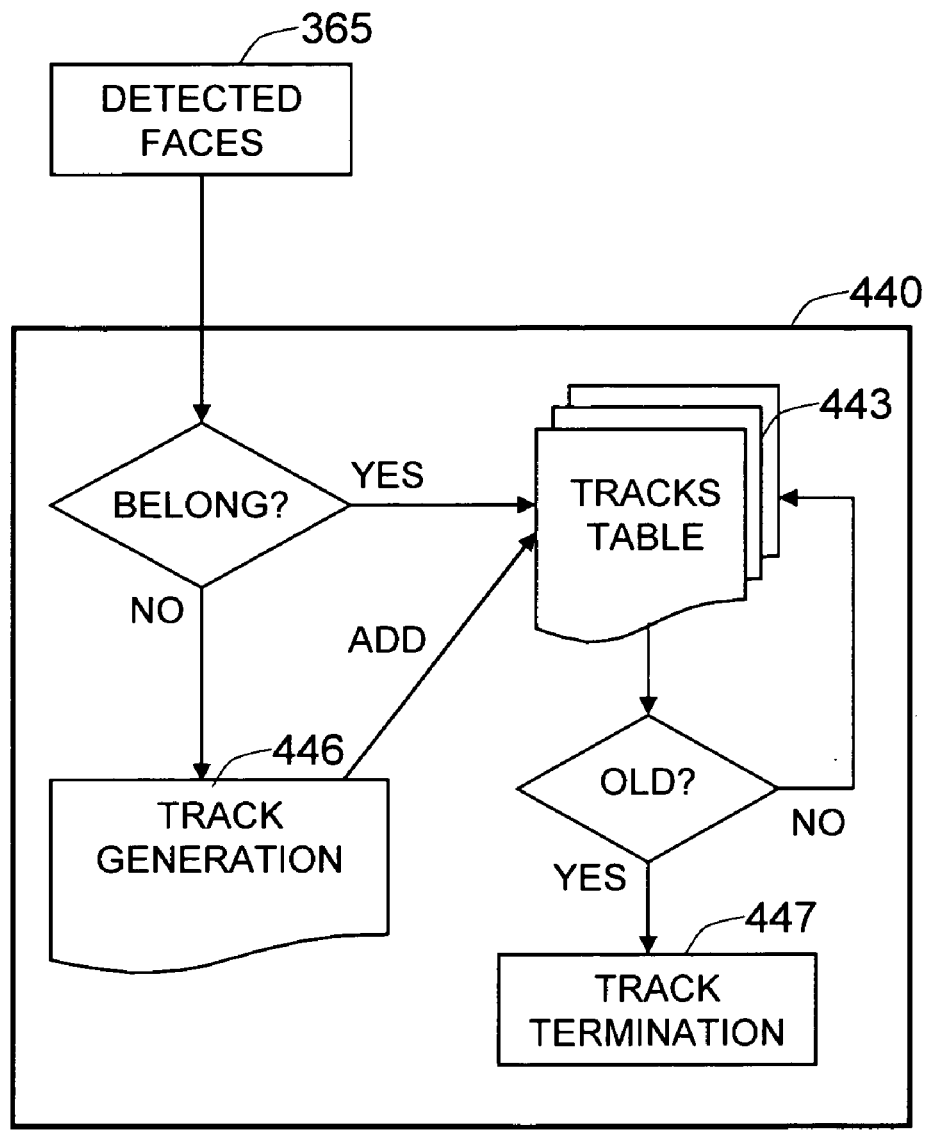
FIG. 13 is an overview of the face tracking method.

FIG. 13 shows a face tracking 440 in an exemplary embodiment of the present invention. The face tracking 440 is carried out on the detected faces 365 from the face detection 360 step. The face tracking serves to keep the identity of the person for reliable age classification. The tracking generates 446 a new track when a new face appears in the scene, assigns detected faces to existing tracks 443 to keep identities of people in the scene, and terminates a track 447 when a person is out of the scene. When new faces are detected in the current video frame, the face tracking constructs a table of the new faces and the existing tracks. Then it computes the match score of each (face, track) pair that measures the likelihood of the given face belonging to the given track. The match score can be computed based on the geometric match (based on the difference in position, size, and the time) between the new face and the last face in the track or the appearance match between the new face and the last face in the track. If the total score is below a predetermined threshold, the pair is excluded from the table. The pair having the highest score gets the assignment: face→track. This procedure is repeated until all of the faces are assigned to matching tracks. However, if there is a new person in the scene, the face is not supposed to have a match with one of the existing tracks. In that case, the threshold should have excluded the face, and the face should remain in the queue. The face then generates a new track 446, and the track is added to the tracks table 443.

For every frame, if a certain track does not have a new face for more than a certain time period, the face tracking terminates 447 the track.

Figure 14:
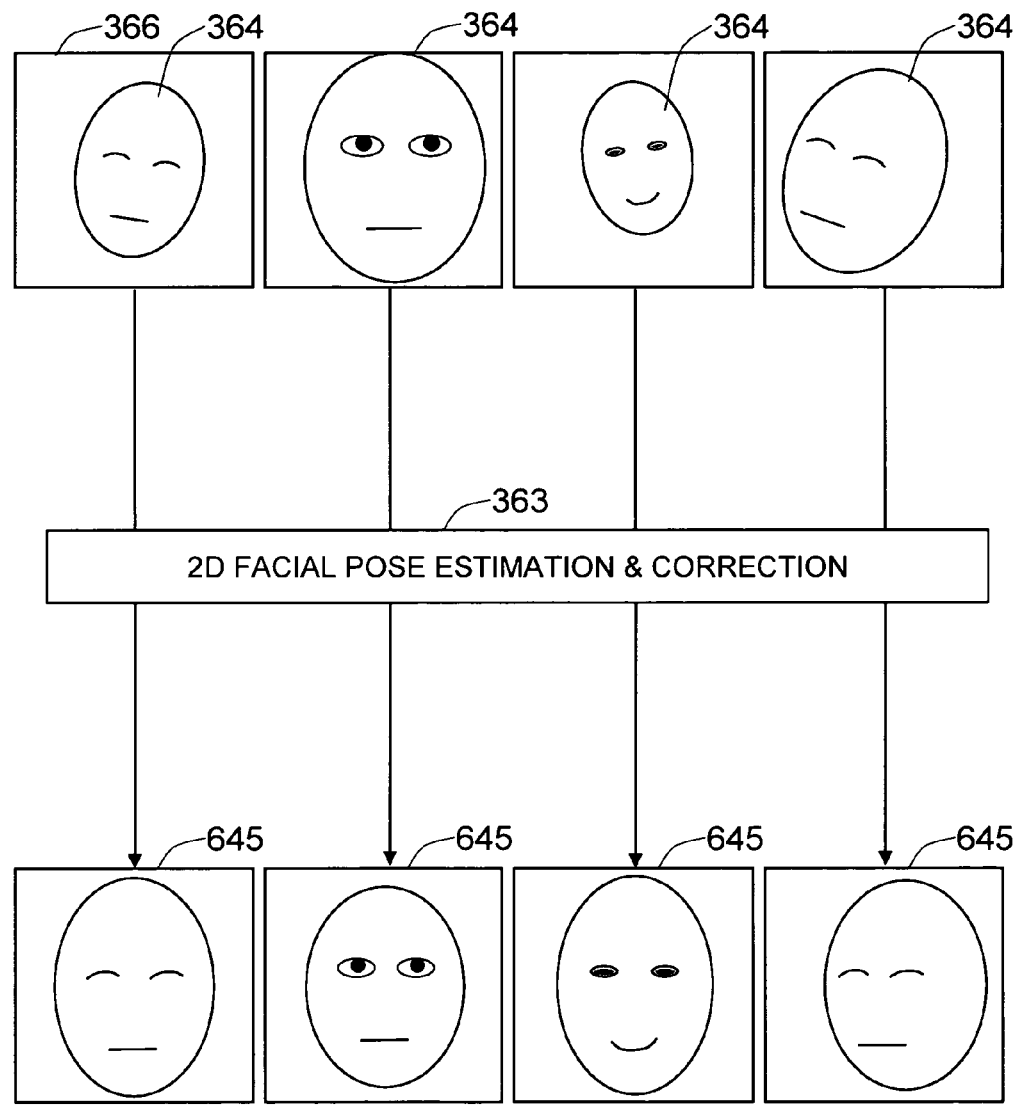
FIG. 14 shows the 2D facial pose estimation and correction step.

FIG. 14 shows the 2D facial pose estimation and correction 363 step. The tracked facial image should be normalized before it is fed to the age classification 802. In an exemplary embodiment, the facial images are aligned so that the respective facial features (eyes, mouths) match. First the 2D facial pose is estimated. A detected face 364 has varied position (X, Y) within the face window 366, and also has varied size S and orientation O. In an exemplary embodiment, the 2D pose (X, Y, S, O) is estimated using a learning machine regressor 832. Given the estimated (X, Y, S, P), the detected and tracked facial image is shifted, resized, and rotated so that the positions of the facial features match the standard positions. The 2D corrected facial image 645 is then fed to the age sensitive feature vector computation 560 step.

Figure 15:
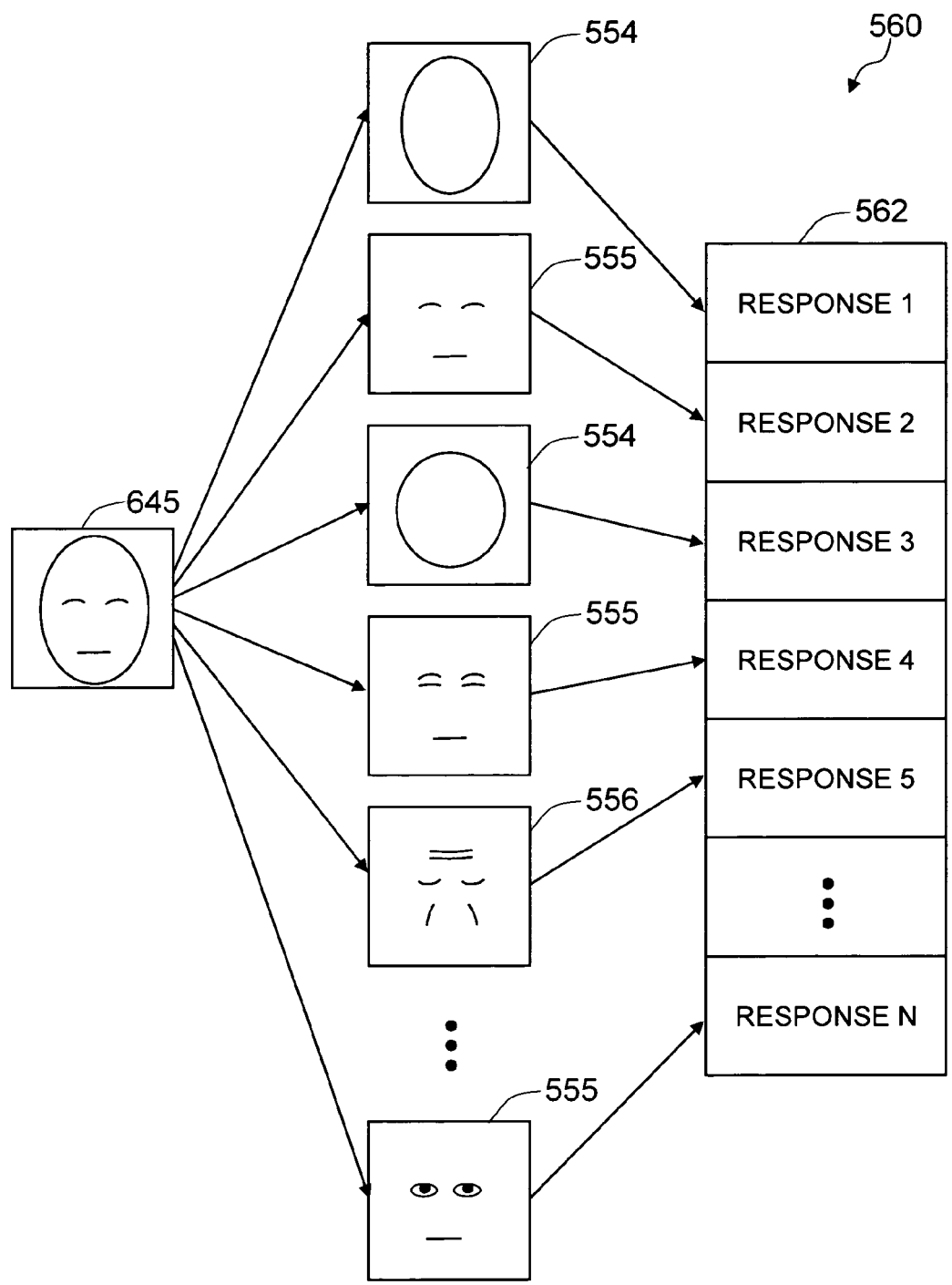
FIG. 15 shows the scheme of age sensitive feature computation.

FIG. 15 shows the scheme of age sensitive feature vector computation 560. The set of age sensitive filters are predetermined, and they are designed to collect high-frequency image structure, such as edges, in a facial image. The facial boundary matched filters 554, the facial feature matched filters 555, and the facial wrinkles matched filters 556 are such examples, and they collect image edge responses matched to these image features. N sets of such filters are prepared. The 2D corrected facial image 645 is fed to these N sets of filters, and the responses are collected as N-dimensional vector, called the age sensitive feature vector 562.

Figure 16:
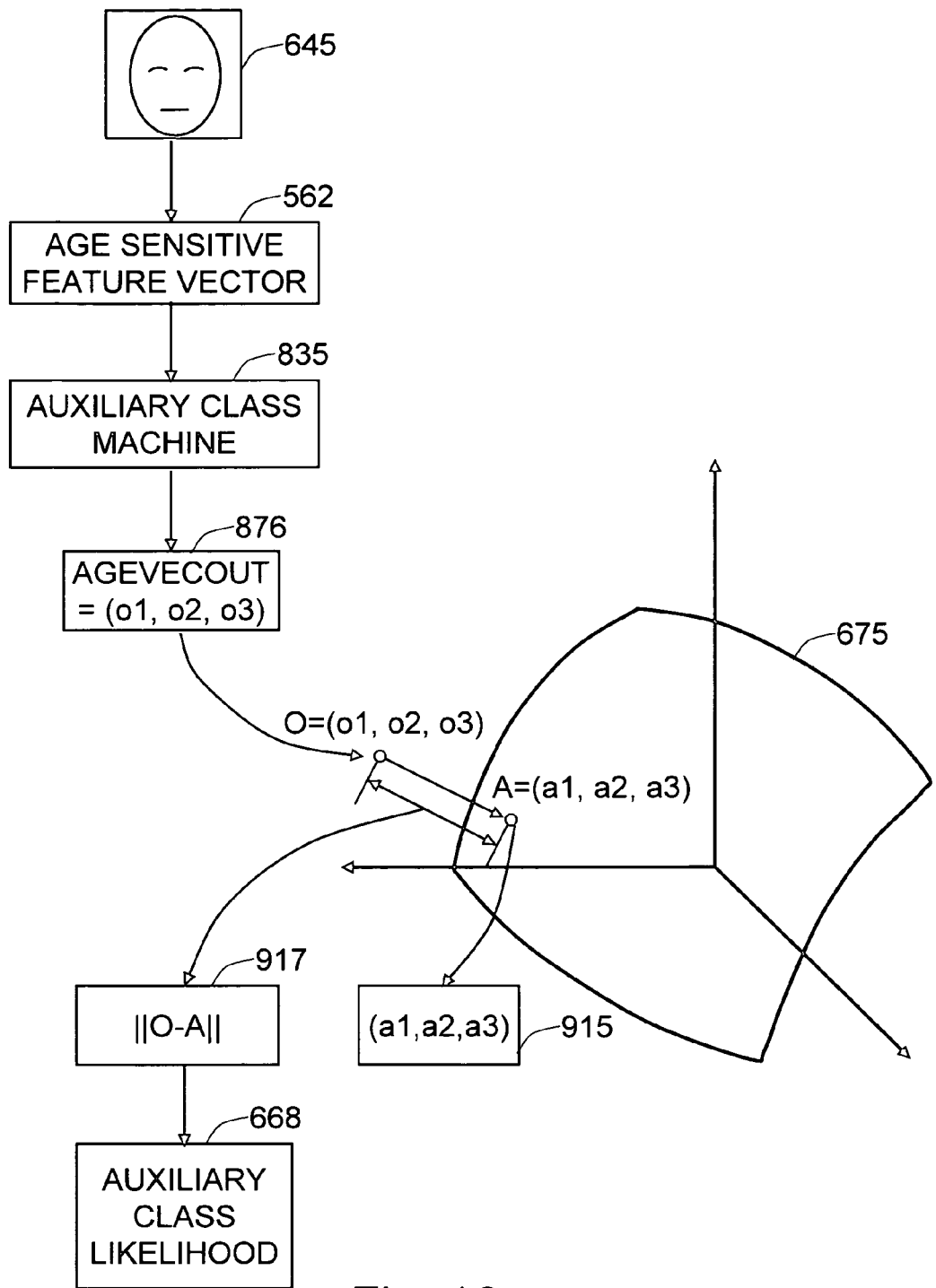
FIG. 16 shows the auxiliary class likelihood and age vector computation scheme.

FIG. 16 shows the auxiliary class likelihood and age vector computation scheme, in an exemplary embodiment of the present invention. Once the auxiliary class machine 835 has been trained as described in FIG. 11, it can take the age sensitive feature vector 562 computed from the 2D corrected facial image 645. The auxiliary class machine 835 then computes the age vector output 876 O=(o1, o2, o3). The age vector output 876 is then projected to the auxiliary class manifold 675 to find the closest age vector on the manifold 915, A=(a1, a2, a3). The cosine function based projection method proposed in Miller can be used as an exemplary embodiment. Then the distance 917 ∥O-A∥ between the age vector output 876 and the closest age vector on the manifold 915 is used to compute the auxiliary class likelihood 668 of the given input face. The age vector on the manifold 915, along with other age vectors computed from other auxiliary class machines, is used to compute the age of the input face.

Figure 17:
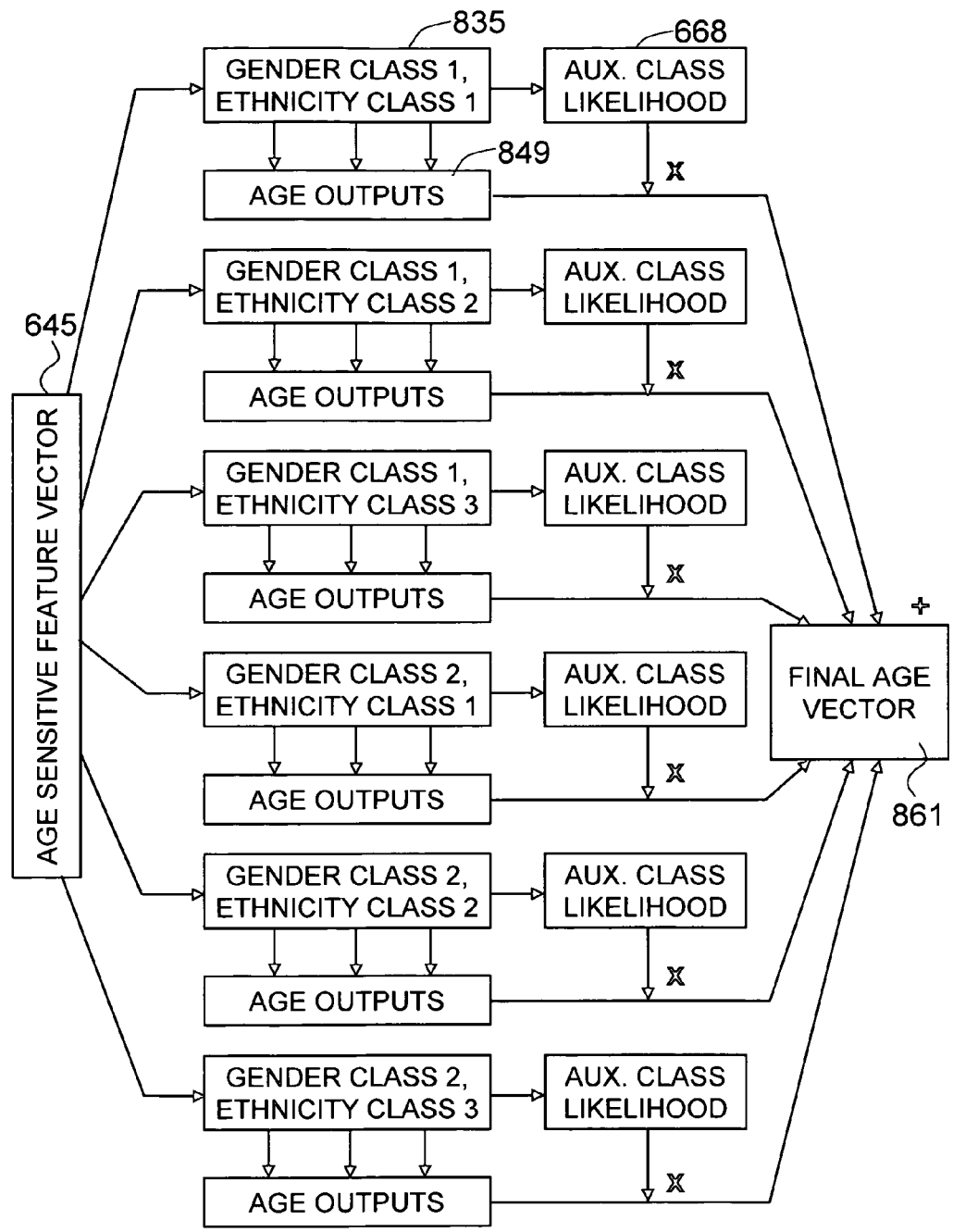
FIG. 17 shows the step of the aggregation of the output response from all of the learning machines to classify the age.

FIG. 17 shows the step of age classification; the output responses from all of the learning machines are integrated to determine the age. The age sensitive feature vector 562 is fed to each auxiliary class machine 835. Each auxiliary class machine 835 computes the auxiliary class likelihood output 668 of the given input image belonging to the auxiliary class, and the age outputs 849. In an exemplary embodiment of the present invention, the set of age outputs is treated as a vector: (child_output, adult_output, senior_output). The age output vectors are weighted by the auxiliary class likelihood output 668, and are added together to compute the final age vector 861: (child_sum, adult_sum, senior_sum). The final decision is based on the age label that has the highest score. For example, if adult_score>child_score and adult_score>senior_score, then adult is chosen as the age of the input facial image.

Figure 18:
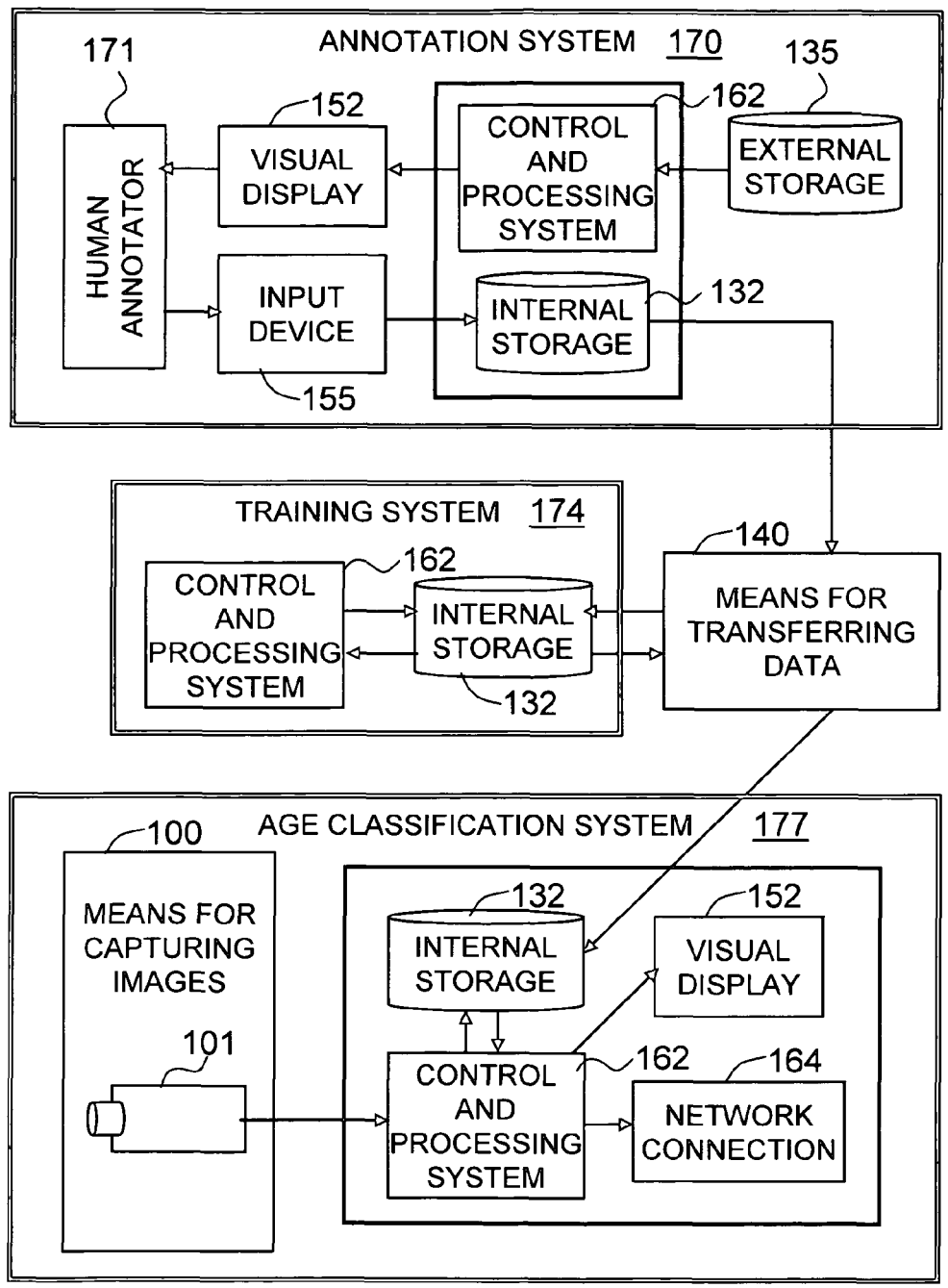
FIG. 18 shows exemplary hardware components in an exemplary embodiment of the present invention.

FIG. 18 shows exemplary hardware components in an exemplary embodiment of the present invention. The hardware components consist of three sub-systems: the annotation system 170, the training system 174, and the age classification system 177.

In an exemplary embodiment of the present invention, the annotation system 170 comprises a human annotator 171, an external storage 135 with a facial image database, and a computer system that consists of a visual display 152, an input device 155, a control and processing system 162, and an internal storage 132. The external storage 135 can comprise a storage computer server or an external hard disk. The visual display 152 can comprise a CRT or an LCD monitor. The input device 155 can comprise a keyboard and a mouse. In an exemplary embodiment, a Pentium 4 2.8 GHz PC having 1 GB memory can serve as a control and processing system 162. A generic IDE hard disk drive can serve as the internal storage 132. The control and processing system 162 samples and fetches a facial image from the external storage 135, and displays it to the visual display 152. The human annotator 171 then annotates the facial image based on the displayed images, and records the annotated training data to the internal storage 132 using the input device 155.

In an exemplary embodiment of the present invention, the training system 174 comprises a generic personal computer having a control and processing system 162 and an internal storage 132. A Pentium 4 2.8 GHz PC having 1 GB memory can serve as a control and processing system 162. A generic IDE hard disk drive can serve as the internal storage 132. The annotated training data from the annotation system 170 can be transferred to the internal storage 132 of the training system 174 using the means for transferring data 140. The means for transferring data 140 can comprise a direct cable connection or a network connection. The control and processing system then applies the training algorithm to generate the trained learning machines.

In an exemplary embodiment of the present invention, the age classification system 177 comprises the means for capturing images 100, and a computer system having a control and processing system 162, and an internal storage 132. The trained learning machines can be transferred to the internal storage 132 of the age estimation system 177 using the means for transferring data 140. In the exemplary embodiment, a plurality of means for capturing images 100 are connected to the control and processing system 162. The control and processing system takes digitized video data from the means for capturing images 100. The control and processing system 162 then processes the digitized facial images using the trained learning machines to classify the age group of the facial image. The classified age can be stored in the internal storage 132, or can be displayed to the visual display 152, or can be transmitted remotely using the network connection 164.

The means for capturing images 100 can comprise an analog camera, USB camera, or Firewire camera. The means for video interface 105, which can comprise a video frame grabber, USB interface, or Firewire interface, is typically included in the same enclosure as the control and processing system 162. The control and processing system 162 can be a general-purpose personal computer, such as a Pentium 4 PC, or a dedicated hardware that can carry out the required computation.

In an exemplary embodiment, a general-purpose USB webcam can serve as the means for capturing images 100. A Pentium 4 2.8 GHz PC having 1 GB memory can serve as a control and processing system 162. A generic IDE hard disk drive can serve as the internal means for storing data 132.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for determining age categories of people, comprising the following steps of:
   a) annotating a facial image database according to the demographics classes of the individual face,
   b) training a plurality of learning machines so that each learning machine outputs auxiliary demographics class information and age information of any given facial image,
   c) detecting and tracking a facial image from the input image frame,
   d) processing said facial image to extract image features, and
   e) processing said image features obtained from said facial image using classification techniques for determining age or age categories,
   whereby the age classes can be any partition based on age in multiple groups,
   wherein the method further comprises a step of determining the target outputs of the plurality of learning machines so that each learning machine maps a first input data, whose facial images belong to a first auxiliary demographics class, to first vector-valued points on a manifold in the space of facial images, whereas each learning machine maps a second input data, whose facial images do not belong to a first auxiliary demographics class, to second vector-valued points away from the manifold.

2. An apparatus for determining age categories of people, comprising:
   a) means for annotating a facial image database according to the demographics classes of the individual face,
   b) means for training a plurality of learning machines so that each learning machine outputs auxiliary demographics class information and age information of any given facial image,
   c) means for detecting and tracking a facial image from the input image frame,
   d) means for processing said facial image to extract image features, and
   e) means for processing said image features obtained from said facial image using classification techniques for determining age or age categories,
   whereby the age classes can be any partition based on age in multiple groups,
   wherein the apparatus further comprises means for determining the target outputs of the plurality of learning machines so that each learning machine maps a first input data, whose facial images belong to a first auxiliary demographics class, to first vector-valued points on a manifold in the space of facial images, whereas each learning machine maps a second input data, whose facial images do not belong to a first auxiliary demographics class, to second vector-valued points away from the manifold.

3. The method according to claim 1, wherein the method further comprises a step of annotating the facial image database with the auxiliary class labels and the age labels of each facial image,
   whereby the auxiliary class is a demographics class defined by the same gender and ethnicity categories.

4. The method according to claim 1, wherein the method further comprises a step of setting up a plurality of learning machines so that each learning machine represents an auxiliary demographics class,
   whereby the auxiliary demographics class comprises facial images having the same gender and ethnicity classes.

5. The method according to claim 1, wherein the method further comprises a step of determining the target age vector outputs of the plurality of learning machines so that each learning machine outputs an age vector,
   wherein each component of the age vector evaluates a function that corresponds to a specific fixed age value.

6. The method according to claim 1, wherein the method further comprises a step of training the plurality of learning machines so that each learning machine is trained to force the distance between the ground truth age vector and the age vector computed by the learning machine to have either of two target values,
   wherein the target value of the learning machine is zero when the input data belong to the given auxiliary class, and the target value is a fixed large value when the input data do not belong to the given auxiliary class.

7. The method according to claim 1, wherein the method further comprises a step of projecting the age vector computed by the learning machine to the closest point on the auxiliary class manifold to determine the likelihood of an input data belonging to an auxiliary demographics class by computing the distance between the age vector and the closest point on the auxiliary class manifold, and to directly use the closest point on the auxiliary manifold as information relevant to determine the age.

8. The method according to claim 1, wherein the method further comprises a step of combining the auxiliary class information and the age information from the plurality of learning machines to estimate the age or age group of the input face, so that the degree of contribution of the age information from each learning machine is determined by the auxiliary class information from the same machine.

9. The method according to claim 1, wherein the method further comprises a step of extracting a set of age sensitive features from a facial image,
- wherein the set of age sensitive features is fed to auxiliary demographics class machines,
- wherein each of the auxiliary demographics class machines computes an auxiliary class likelihood output of the facial image belonging to the auxiliary demographics class and age outputs, and
- whereby the set of age sensitive features are computed by applying a set of high frequency filters that are designed to extract the positions and shapes of facial boundary, facial features, and to extract facial wrinkles.

10. The method according to claim 9, wherein the method further comprises a step of training a plurality of learning machines using the age sensitive features as training data to classify the age of the facial image,
- wherein a desired age vector and auxiliary class likelihood output is calculated for each training data, and
- wherein each training data corresponds to one of the auxiliary demographics classes.

11. The method according to claim 1, wherein the method further comprises a step of arranging the plurality of learning machines in serial,
- wherein the arrangement can be any sequential ordering of the plurality of classifiers.

12. The method according to claim 1, wherein the method further comprises a step of arranging the plurality of learning machines in parallel.

13. The method according to claim 1, wherein the method further comprises a step of arranging a plurality of classifiers in a manner of combining chains of serial classifiers in parallel,
- whereby the first classifier in each chain of serial classifiers performs a gross-level classification into gross-level classes by computing gross-level class information and the second classifier in each chain of serial classifiers performs a finer level classification that is specialized to one of the gross-level classes by computing the finer level class information.

14. The apparatus according to claim 2, wherein the apparatus further comprises means for annotating the facial image database with the auxiliary class labels and the age labels of each facial image,
- whereby the auxiliary class is a demographics class defined by the same gender and ethnicity categories.

15. The apparatus according to claim 2, wherein the apparatus further comprises means for setting up a plurality of learning machines so that each learning machine represents an auxiliary demographics class,
- whereby the auxiliary demographics class comprises facial images having the same gender and ethnicity classes.

16. The apparatus according to claim 2, wherein the apparatus further comprises means for determining the target age vector outputs of the plurality of learning machines so that each learning machine outputs an age vector,
- wherein each component of the age vector evaluates a function that corresponds to a specific fixed age value.

17. The apparatus according to claim 2, wherein the apparatus further comprises means for training the plurality of learning machines so that each learning machine is trained to force the distance between the ground truth age vector and the age vector computed by the learning machine to have either of two target values,
- wherein the target value of the learning machine is zero when the input data belong to the given auxiliary class, and the target value is a fixed large value when the input data do not belong to the given auxiliary class.

18. The apparatus according to claim 2, wherein the apparatus further comprises means for projecting the age vector computed by the learning machine to the closest point on the auxiliary class manifold to determine the likelihood of an input data belonging to an auxiliary demographics class by computing the distance between the age vector and the closest point on the auxiliary class manifold, and to directly use the closest point on the auxiliary manifold as information relevant to determine the age.

19. The apparatus according to claim 2, wherein the apparatus further comprises means for combining the auxiliary class information and the age information from the plurality of learning machines to estimate the age or age group of the input face, so that the degree of contribution of the age information from each learning machine is determined by the auxiliary class information from the same machine.

20. The apparatus according to claim 2, wherein the apparatus further comprises means for extracting a set of age sensitive features from a facial image,
- wherein the set of age sensitive features is fed to auxiliary demographics class machines,
- wherein each of the auxiliary demographics class machines computes an auxiliary class likelihood output of the facial image belonging to the auxiliary demographics class and age outputs, and
- whereby the set of age sensitive features are computed by applying a set of high frequency filters that are designed to extract the positions and shapes of facial boundary, facial features, and to extract facial wrinkles.

21. The apparatus according to claim 20, wherein the apparatus further comprises means for training a plurality of learning machines using the age sensitive features as training data to classify the age of the facial image,
- wherein a desired age vector and auxiliary class likelihood output is calculated for each training data, and
- wherein each training data corresponds to one of the auxiliary demographics classes.

22. The apparatus according to claim 2, wherein the apparatus further comprises means for arranging the plurality of learning machines in serial,
- wherein the arrangement can be any sequential ordering of the plurality of classifiers.

23. The apparatus according to claim 2, wherein the apparatus further comprises means for arranging the plurality of learning machines in parallel.

24. The apparatus according to claim 2, wherein the apparatus further comprises means for arranging a plurality of classifiers in a manner of combining chains of serial classifiers in parallel,
- whereby the first classifier in each chain of serial classifiers performs a gross-level classification into gross-level classes by computing gross-level class information and the second classifier in each chain of serial classifiers performs a finer level classification that is specialized to one of the gross-level classes by computing the finer level class information.

* * * * *